United States Patent
Kim et al.

(10) Patent No.: US 11,425,323 B2
(45) Date of Patent: Aug. 23, 2022

(54) IMAGE SENSOR AND OPERATING METHOD THEREOF

(71) Applicant: SAMSUNG ELECTRONICS CO., LTD., Suwon-si (KR)

(72) Inventors: Mooyoung Kim, Suwon-si (KR); Seonghyeon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/402,179

(22) Filed: Aug. 13, 2021

(65) Prior Publication Data
US 2022/0078364 A1  Mar. 10, 2022

(51) Int. Cl.
| H04N 5/369 | (2011.01) |
| H04N 5/3745 | (2011.01) |
| H04N 5/376 | (2011.01) |
| H04N 5/341 | (2011.01) |
| H04N 5/378 | (2011.01) |

(52) U.S. Cl.
CPC ......... *H04N 5/36961* (2018.08); *H04N 5/341* (2013.01); *H04N 5/378* (2013.01); *H04N 5/3745* (2013.01); *H04N 5/3765* (2013.01)

(58) Field of Classification Search
CPC .. H04N 5/36961; H04N 5/341; H04N 5/3745; H04N 5/3765; H04N 5/378; H04N 5/347; H04N 9/04557; H04N 5/374; H04N 5/3692; H04N 5/3741
See application file for complete search history.

(56) References Cited

U.S. PATENT DOCUMENTS

| 10,014,338 | B2 | 7/2018 | Lee |
| 10,015,376 | B2* | 7/2018 | Uchida ............. H04N 5/36961 |
| 10,313,579 | B2 | 6/2019 | Kadambala et al. |
| 10,362,214 | B2* | 7/2019 | Inagaki ............ H04N 5/232123 |
| 10,389,956 | B2* | 8/2019 | Kim ..................... H04N 5/3575 |
| 10,498,998 | B2 | 12/2019 | Mn |
| 10,616,509 | B2 | 4/2020 | Seki et al. |
| 2015/0296129 | A1* | 10/2015 | Ishikawa ........... H04N 5/36961 348/349 |
| 2018/0213142 | A1* | 7/2018 | Usui .................. H04N 5/37457 |
| 2019/0098240 | A1* | 3/2019 | Kobayashi ............ H04N 5/369 |
| 2020/0104034 | A1 | 4/2020 | Lee et al. |

FOREIGN PATENT DOCUMENTS

EP          3 399 355 A1    11/2018

* cited by examiner

*Primary Examiner* — Nhan T Tran
(74) *Attorney, Agent, or Firm* — Sughrue Mion, PLLC

(57) ABSTRACT

An image sensor includes a pixel array including a plurality of pixels arranged in a matrix, each of the pixels including a microlens, a first photoelectric conversion element, and a second photoelectric conversion element, the first and second photoelectric conversion elements being arranged parallel with each other in a first direction below the microlens; and a row decoder configured to control a first image signal generated by the first photoelectric conversion element and a sum image signal generated by the first and second photoelectric conversion elements to be sequentially output from a first pixel in a first row of the pixel array during a first readout period, and to control a second image signal generated by the second photoelectric conversion element and the sum image signal to be sequentially output from a second pixel in a second row of the pixel array during a second readout period.

20 Claims, 20 Drawing Sheets

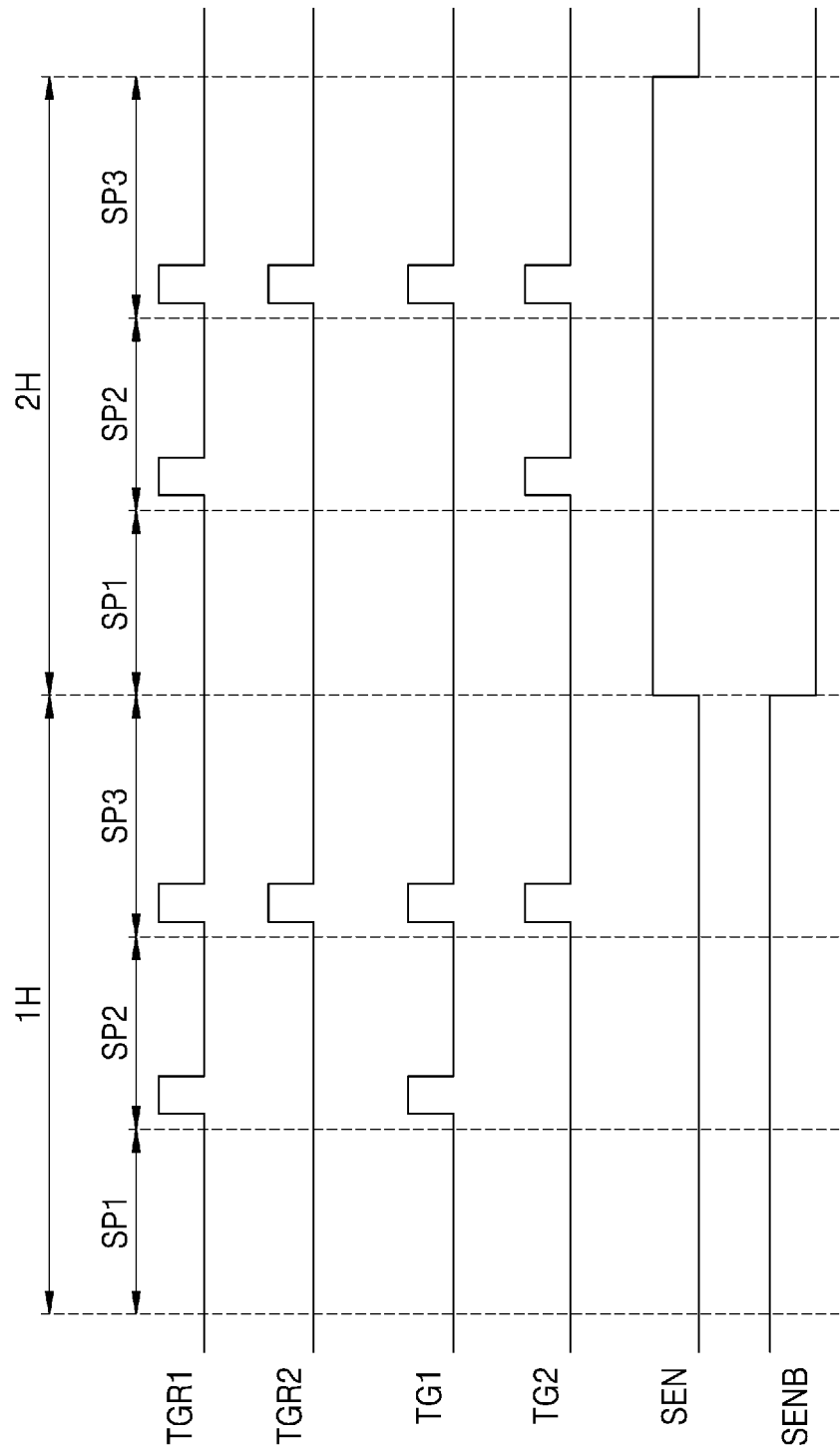

IMAGE SENSOR AND OPERATING METHOD THEREOF

CROSS-REFERENCE TO RELATED APPLICATION

This application is based on and claims priority under 35 U.S.C. § 119 to Korean Patent Application No. 10-2020-0115654, filed on Sep. 9, 2020, in the Korean Intellectual Property Office, the disclosure of which is incorporated by reference herein in its entirety.

BACKGROUND

The present disclosure relates to an image sensor, and more particularly, to an image sensor for performing an auto-focus function and reading method of the image sensor.

Recently, autofocus (AF), by which the focus of an image sensor is automatically detected, has been widely used. A phase difference autofocus (PAF) technique has been variously researched and developed because of a fast focus detection speed. The PAF technique splits light that has passed through a photographic lens, detects the light at different positions, and controls a focal distance by automatically driving a focusing lens such that detected signals have the same intensity at one phase. Autofocus setting is generally performed using an AF sensor, which is much smaller than an image sensor, or using an AF module in an image sensor by providing a portion of the image sensor with a focus detection pixel apart from an image detection pixel. Recently, there has been research into increasing a focus detection speed by forming a pair of photoelectric conversion elements with a focus detection pixel or the entirety of an image detection pixel. A focus detection speed and accuracy may be increased by performing PAF detection on each pixel or certain adjacent pixels.

SUMMARY

One or more example embodiments provide an image sensor for providing a high frame rate and a high-speed autofocus function and an operating method of the image sensor.

According to an aspect of an example embodiment, there is provided an image sensor including: a pixel array including a plurality of pixels arranged in a matrix, each pixel of the plurality of pixels including a microlens, a first photoelectric conversion element, and a second photoelectric conversion element, the first photoelectric conversion element and the second photoelectric conversion element being arranged in parallel with each other in a first direction below the microlens; and a row decoder configured to: control a first image signal and a first sum image signal to be sequentially output from a first pixel in a first row of the pixel array during a first readout period, the first image signal being generated by the first photoelectric conversion element of the first pixel and the first sum image signal being generated by the first photoelectric conversion element and the second photoelectric conversion element of the first pixel, and control a second image signal and a second sum image signal to be sequentially output from a second pixel in a second row of the pixel array during a second readout period, the second image signal being generated by the second photoelectric conversion element of the second pixel and the second sum image signal being generated by the first photoelectric conversion element and the second photoelectric conversion element of the second pixel.

According to an aspect of an example embodiment, there is provided an image sensor including: a pixel array including a plurality of row lines extending in a first direction, a plurality of column lines extending in a second direction perpendicular to the first direction, and a plurality of pixels connected to the plurality of row lines and the plurality of column lines and arranged in a matrix, each pixel of the plurality of pixels including a first sub pixel and a second sub pixel that are arranged in parallel with each other in a third direction; and a row decoder configured to provide a plurality of first control signals to a first pixel in a first row of the pixel array and to provide a plurality of second control signals to a second pixel in a second row of the pixel array, wherein the pixel array is configured to: during a first readout period, output a first image signal from the first sub pixel of the first pixel and output a first sum image signal from the first sub pixel and the second sub pixel of the first pixel through a first column line in response to the plurality of first control signals; and during a second readout period, output a second image signal from the second sub pixel of the second pixel and output a second sum image signal from the first sub pixel and the second sub pixel of the second pixel through the first column line in response to the plurality of second control signals.

According to an aspect of an example embodiment, there is provided an image sensor including: a pixel array including a plurality of first pixels in a first row and a plurality of second pixels in a second row, each first pixel of the plurality of first pixels and each second pixel of the plurality of second pixels including a first photoelectric conversion element and a second photoelectric conversion element arranged in parallel with each other in a first direction; a row decoder configured to provide a plurality of first control signals to the plurality of first pixels through a plurality of first row lines and to provide a plurality of second control signals to the plurality of second pixels through a plurality of second row lines; and a readout circuit configured to receive a plurality of pixel signals from the pixel array through a plurality of column lines and to perform analog-to-digital conversion on the plurality of pixel signals, wherein each first pixel of the plurality of first pixels is configured to, during a first readout period, sequentially output, as first pixel signals, a first reset signal, a first image signal from the first photoelectric conversion element of each first pixel, and a first sum image signal from the first photoelectric conversion element and the second photoelectric conversion element of each first pixel to the readout circuit, and wherein each second pixel of the plurality of second pixels is configured to, during a second readout period, sequentially output, as second pixel signals, a second reset signal, a second image signal from the second photoelectric conversion element of each second pixel, and a second sum image signal from the first photoelectric conversion element and the second photoelectric conversion element of each second pixel to the readout circuit.

According to an aspect of an example embodiment, there is provided a method of operating an image sensor including a pixel array, the method including: outputting a first image signal from a first photoelectric conversion element of a first pixel in a first row of the pixel array, the first pixel including the first photoelectric conversion element and a second photoelectric conversion element arranged in parallel with each other in a first direction; outputting a first sum image signal from the first photoelectric conversion element and the second photoelectric conversion element of the first pixel; outputting a second image signal from a second photoelectric conversion element of a second pixel in the first row of the pixel array, the second pixel including a first photoelectric conversion element and the second photoelectric conversion element arranged in parallel with each other in the first direction; outputting a second sum image signal from the first photoelectric conversion element and the second photoelectric conversion element of the second pixel; and generating autofocus data based on the first image signal and the second image signal.

BRIEF DESCRIPTION OF THE DRAWINGS

The above and/or other aspects will be more apparent by describing certain example embodiments with reference to the accompanying drawings, in which:

FIGS. 10A and 10B are respectively a schematic block diagram and a schematic timing diagram of a row decoder, according to an example embodiment;

DETAILED DESCRIPTION

Hereinafter, example embodiments will be described in detail with reference to the accompanying drawings.

Figure 1:
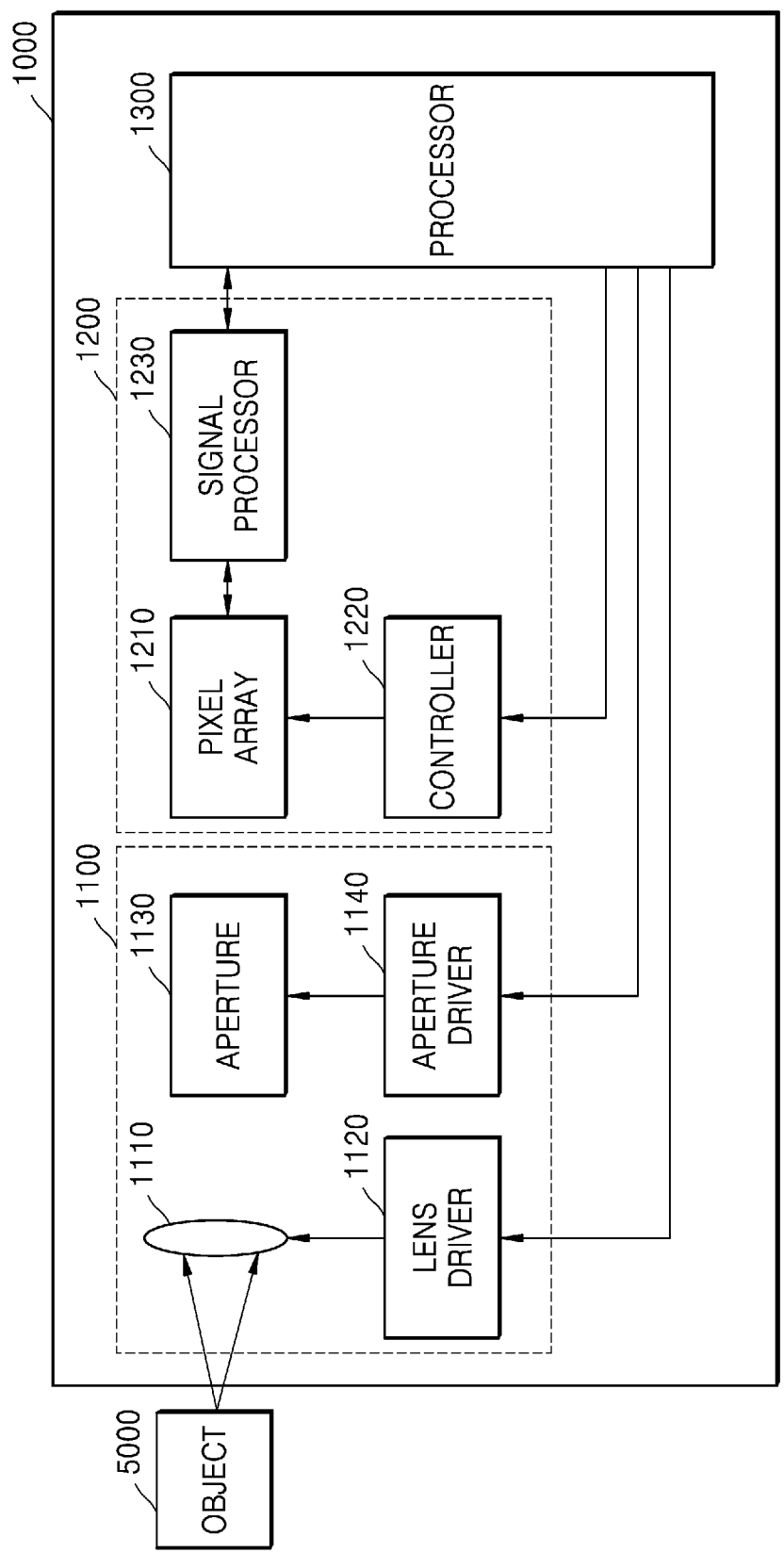
FIG. 1 is a block diagram of a digital imaging device according to an example embodiment.

FIG. 1 is a block diagram of a digital imaging device 1000 according to an example embodiment.

The digital imaging device 1000 may include an imaging unit 1100, an image sensor 1200, and a processor 1300. The digital imaging device 1000 may have an autofocus function (hereinafter, referred to as an AF function).

The operations of the digital imaging device 1000 may be controlled by the processor 1300. The processor 1300 may provide each of a lens driver 1120, an aperture driver 1140, and a controller 1220 with a control signal for an operation of each corresponding element.

The imaging unit 1100 receives light and may include a lens 1110, the lens driver 1120, an aperture 1130, and the aperture driver 1140. The lens 1110 may include a plurality of lenses.

The lens driver 1120 may exchange information about focus detection with the processor 1300 and may control the position of the lens 1110 according to a control signal from the processor 1300. The lens driver 1120 may control the position of the lens 1110 by moving the lens 1110. For example, the lens driver 1120 may move the lens 1110 in a direction away from or toward an object 5000, thereby controlling the distance between the lens 1110 and the object 5000. The object 5000 may be in focus or out of focus according to the position of the lens 1110.

The image sensor 1200 may convert incident light into an image signal. The image sensor 1200 may include a pixel array 1210, the controller 1220, and a signal processor 1230. An optical signal that has passed through the lens 1110 and the aperture 1130 may form an image of the object 5000 when the optical signal reaches a light receiving surface of the pixel array 1210.

The pixel array 1210 may include a complementary metal-oxide semiconductor (CMOS) image sensor (CIS), which converts an optical signal into an electrical signal. The sensitivity or the like of the pixel array 1210 may be controlled by the controller 1220. The pixel array 1210 may include a plurality of pixels in a matrix. Each of the pixels may include a microlens and at least two photoelectric conversion elements arranged in parallel with each other below the microlens. Each of the pixels may include at least one first photoelectric conversion element and at least one second photoelectric conversion element, which are parallel with each other. A pixel may output a first image signal generated by the first photoelectric conversion element or a second image signal generated by the second photoelectric conversion element. The pixel may output a sum image signal generated by the first and second photoelectric conversion elements.

The signal processor 1230 may generate a phase detection signal pair, which is used in a phase difference calculation, based on the first image signal and the second image signal, which are output from at least two pixels in different adjacent rows and one column. In the case of out-of-focus, the phase of the first image signal may be different from the phase of the second image signal. For example, the intensity of the first image signal may be different from the intensity of the second image signal. In the case of in-focus, the phase of the first image signal may be the same as the phase of the second image signal.

The signal processor 1230 may generate a plurality of phase detection signal pairs based on a plurality of first image signals and a plurality of second image signals, which are output from the pixel array 1210. The phase detection signal pairs or a first image and a second image, which are generated from the phase detection signal pairs, may be provided to the processor 1300 as autofocus data.

The processor 1300 may receive image data from the image sensor 1200. The image data may include an image and/or autofocus data in units of frames. The processor 1300 may perform a phase difference calculation for an AF function using the autofocus data. In an example embodiment, the processor 1300 may perform a phase difference calculation based on a plurality of phase detection signal pairs included in the autofocus data. For example, the processor 1300 may generate a first image based on a plurality of first phase detection signals among the phase detection signal pairs and a second image based on a plurality of second phase detection signals among the phase detection signal pairs and may calculate a phase difference between the first image and the second image.

Through the phase difference calculation, the processor 1300 may obtain a position of a focus, at which the intensities of two phase detection signals included in a phase detection signal pair are identical to each other (i.e., the phase of the first image is the same as the phase of the second image), a direction of the focus, and/or a distance between the object 5000 and the image sensor 1200.

The processor 1300 may generate a control signal for controlling the lens driver 1120 to move the lens 1110 based on a phase difference calculation result and may output the control signal to the lens driver 1120.

Figure 2:
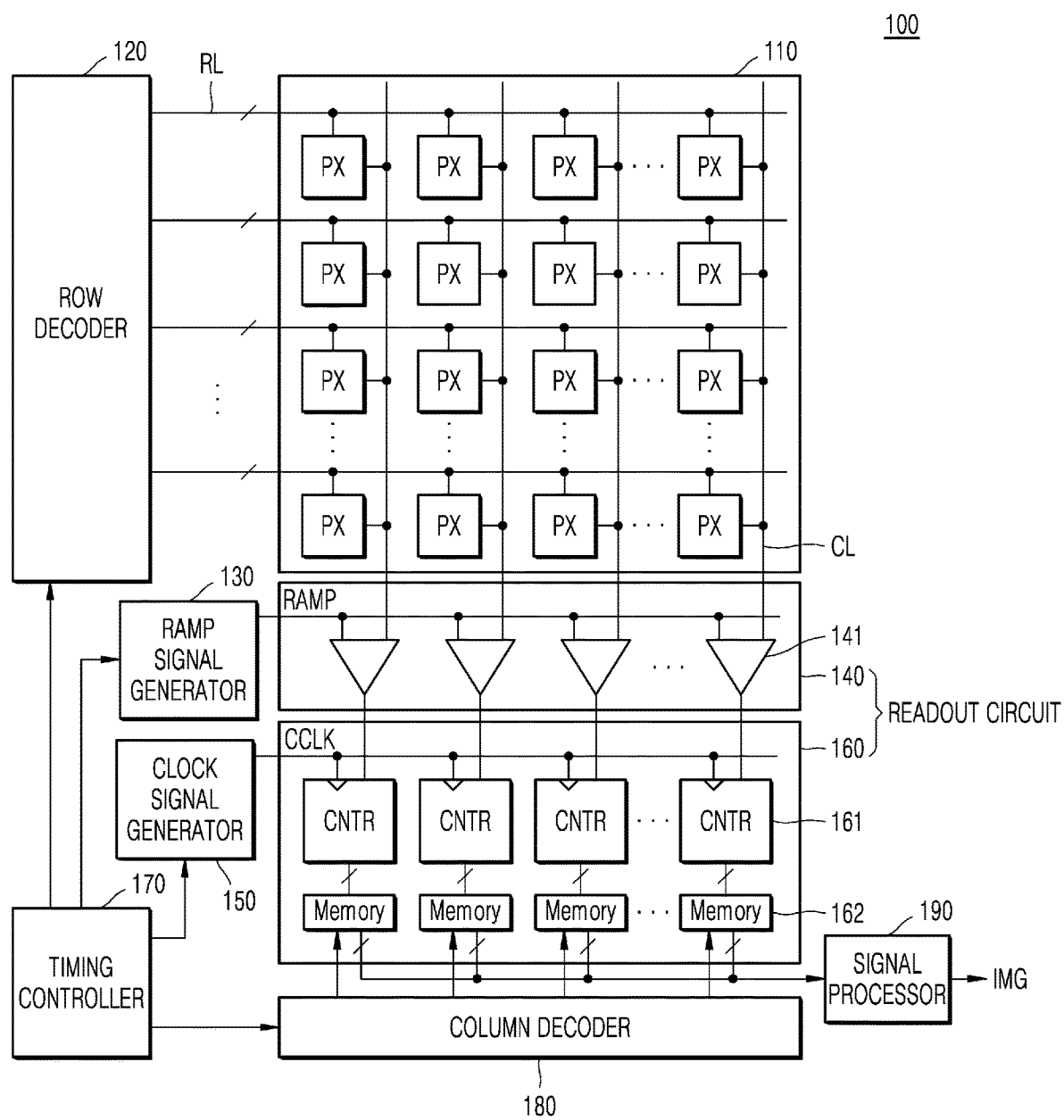
FIG. 2 is a block diagram of an image sensor according to an example embodiment.

FIG. 2 is a block diagram of an image sensor 100 according to an example embodiment.

The image sensor 100 may be mounted on an electronic device having an image or optical sensing function and particularly, on an electronic device having an AF function. For example, the image sensor 100 may be mounted on an electronic device, such as a camera, a smartphone, a wearable device, an Internet of things (IoT) device, a tablet personal computer (PC), a personal digital assistant (PDA), a portable multimedia player (PMP), or a navigation device. The image sensor 100 may also be mounted on electronic devices that are used as components of vehicles, furniture, manufacturing facilities, doors, or various kinds of measuring equipment.

The image sensor 100 may include a pixel array 110, a row decoder 120, a ramp signal generator 130, a comparator circuit 140, a clock signal generator 150, a counter circuit 160, a timing controller 170, a column decoder 180, and a signal processor 190. The comparator circuit 140 and the counter circuit 160 may be referred to as a readout circuit (or an analog-to-digital converter circuit).

The pixel array 110 may include a plurality of row lines RL, a plurality of column lines CL, and a plurality of pixels PX, which are connected to the row lines RL and the column lines CL and arranged in a matrix.

The pixels PX may sense incident light and output an image signal, i.e., an electrical signal corresponding to the sensed light, using a photoelectric conversion element. The pixels PX may include a red pixel, a green pixel, and a blue pixel. The red pixel may generate an image signal (or charges) corresponding to a red color signal in response to wavelengths in the red range of the visible spectrum. The green pixel may generate an image signal (or charges) corresponding to a green color signal in response to wavelengths in the green range of the visible spectrum. The blue pixel may generate an image signal (or charges) corresponding to a blue color signal in response to wavelengths in the blue range of the visible spectrum. However, embodiments are not limited thereto, and the pixels PX may further include a white pixel. For example, the pixels PX may include a cyan pixel, a yellow pixel, a magenta pixel, or a white pixel.

A microlens and a color filter may be provided (e.g., stacked) above each of the pixels PX. A plurality of color filters of the pixels PX may form a color filter array. A color filter may pass a certain color of light, i.e., wavelengths in a certain color range, in the light incident through a microlens. A color sensed by a pixel PX may be determined according to a color filter provided corresponding to the pixel PX. However, embodiments are not limited thereto. According to an example embodiment, light corresponding to wavelengths in a color range may be converted into an electrical signal according to the level of an electrical signal, e.g., a voltage level, applied to a photoelectric conversion element of the pixel PX, and therefore, a color sensed by the pixel PX may be determined according to the level of the electrical signal applied to the photoelectric conversion element.

Each of the pixels PX may include at least two photoelectric conversion elements (referred to as photosensitive elements). For example, a photoelectric conversion element may include a photodiode, a photo transistor, a photogate, or a pinned photodiode. At least two photoelectric conversion elements may independently generate photocharge and thus generate individual image signals.

Each of the pixels PX may include a first photoelectric conversion element to the left of (or above) the optical axis of a microlens and a second photoelectric conversion element to the right of (or below) the optical axis of the microlens. Each of the pixels PX may output a first image signal generated by the first photoelectric conversion element or a second image signal generated by the second photoelectric conversion element. Among two pixels PX in two adjacent rows and one column, one pixel PX may output the first image signal generated by the first photoelectric conversion element, and the other pixel PX may output the second image signal generated by the second photoelectric conversion element. At this time, the two pixels PX may sense the same color. Autofocus data, e.g., a phase detection signal pair, used in a phase difference calculation for an AF function may be generated based on the first image signal and the second image signal, which are respectively output from the two pixels PX.

A pixel PX may output a sum image signal generated by at least one first photoelectric conversion element and at least one second photoelectric conversion element. The sum image signal may be used to generate an image for each frame.

The row decoder 120 may generate a plurality of control signals for controlling the operations of pixels PX in each row under the control of the timing controller 170. The row decoder 120 may provide the control signals to the pixels PX of the pixel array 110 through the row lines RL. The pixel array 110 may be driven row by row in response to the control signals from the row decoder 120. In other words, the pixels PX of the pixel array 110 may sequentially output pixel signals row by row. At this time, a pixel signal may include a reset signal indicating a reset level of a pixel PX and an image signal generated by a photoelectric conversion element.

The ramp signal generator 130 may generate a ramp signal RAMP (e.g., a ramp voltage), of which the level increases or decreases with a certain slope, under the control of the timing controller 170. The ramp signal RAMP may be provided to each of a plurality of comparators 141 of the comparator circuit 140.

The comparator circuit 140 may include the comparators 141 and convert a plurality of pixel signals, which are received from the pixel array 110 through the column lines CL, into a plurality of digital signals. Each of the comparators 141 may convert a pixel signal into a digital signal based on the ramp signal RAMP. When the level of the ramp signal RAMP is the same as the level of the pixel signal, each comparator 141 may output a comparison signal, which transitions from a first level (e.g., logic high) to a second level (e.g., logic low) A level transition time of the comparison signal may be determined according to the level of the pixel signal.

The comparator 141 may include a circuit using correlated double sampling (CDS), e.g., a CDS circuit. The comparator 141 may sample or hold the pixel signal from the pixel PX, may double sample the level of certain noise (e.g., a reset signal) and the level of an image signal, and may generate the comparison signal based on a difference between the double-sampled levels. For example, the comparator 141 may include at least one operational transconductance amplifier (OTA) (or differential amplifier), two sample and hold capacitors respectively connected to two input terminals of the OTA, and two switches, which respectively connect two input terminals of the OTA to two output terminals of the OTA in an auto-zero operation. Here, reset noise of the pixel signal and an offset of the comparator 141 may be eliminated by the auto-zero operation.

The clock signal generator 150 may generate a counting clock signal CCLK to be provided to the counter circuit 160. The generation timing and the frequency of the counting clock signal CCLK may be controlled by the timing controller 170. In an example embodiment, the clock signal generator 150 may include a gray code generator. The clock signal generator 150 may generate, as the counting clock signal CCLK, a plurality of code values having a resolution according to a set number of bits. For example, when a 10-bit code is set, the clock signal generator 150 may generate the counting clock signal CCLK including 1024 code values. When an 11-bit code is set, the clock signal generator 150 may generate the counting clock signal CCLK including 2048 code values.

The counter circuit 160 may include a plurality of counters (CNTR) 161. Each of the counters 161 may count a level transition time of a comparison signal, which is output from a corresponding comparator 141, based on the counting clock signal CCLK and may output a count value. In an example embodiment, each counter 161 may include a latch circuit and an operational circuit. The latch circuit may latch a code value, which is received as the counting clock signal CCLK, at a level transition time of the comparison signal from the comparator 141. The latch circuit may latch a code value, e.g., a reset value, corresponding to a reset signal and a code value, e.g., an image signal value, corresponding to an image signal. The operational circuit may perform an operation on the reset value and the image signal value and thus generate an image signal value having a reset level of the pixel PX removed therefrom. The counter 161 may output, as a pixel value, the image signal value having the reset level removed therefrom. However, embodiments are not limited thereto. The counter 161 may include an operational circuit and an up-counter, which increases a count value based on the counting clock signal CCLK, or may include an up/down-counter, or a bitwise inversion counter.

In an example embodiment, the counter circuit 160 may include a plurality of memories. The memories 162 may respectively store pixel values output from the counters 161. The memories 162 may include a static random access memory (SRAM), a latch, a flip-flop, or a combination thereof but is not limited thereto.

The column decoder 180 may control the output timing of a pixel value stored in each of the memories 162, under the control of the timing controller 170. In an example embodiment, the memories 162 may sequentially output pixel values under the control of the column decoder 180. The pixel values may be output to the outside of the image sensor 100 or to the signal processor 190.

The timing controller 170 may generate control signals for controlling the operations of the row decoder 120, the ramp signal generator 130, the comparator circuit 140, the clock signal generator 150, the counter circuit 160, and the column decoder 180. The timing controller 170 may be implemented as the controller 1220 in FIG. 1 or a part of the controller 1220.

The signal processor 190 may perform signal processing on image data, e.g., a plurality of pixel values, received from the counter circuit 160 The signal processor 190 may generate autofocus data based on a plurality of first pixel values (e.g., a plurality of first image signal values) corresponding to a plurality of first image signals and a plurality of second pixel values (e.g., a plurality of second image signal values) corresponding to a plurality of second image signals.

The signal processor 190 may perform noise reduction, gain tuning, waveform shaping, interpolation, white balance, a gamma process, edge enhancement, binning, or the like on the image data. In an example embodiment, the signal processor 190 may be provided in the processor 1300 (in FIG. 1) outside the image sensor 100.

Figure 3:
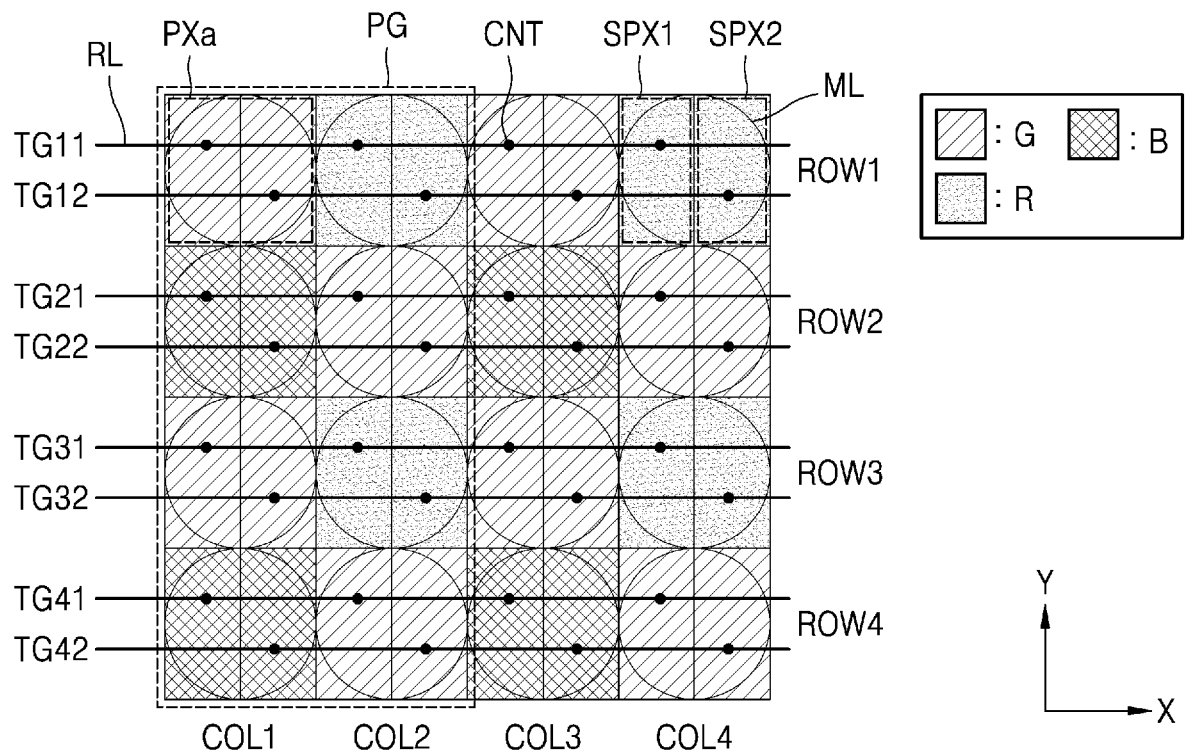
FIG. 3 is a diagram of a pixel array according to an example embodiment.

FIG. 3 is a diagram of a pixel array according to an example embodiment.

Referring to FIG. 3, a pixel array 110a includes a plurality of pixels PXa in a matrix. For example, the pixels PXa may include a plurality of green pixels G, a plurality of blue pixels B, and a plurality of red pixels R. Two green pixels G, a blue pixel B, and a red pixel R may be arranged in a 2×2 matrix, and the two green pixels G may be arranged in a diagonal direction. This pixel pattern may be repeated in the pixel array 110a. Although 16 pixels PXa are arranged in a first row ROW1, a second row ROW2, a third row ROW3, and a fourth row ROW4 and a first column COL1, a second column COL2, a third column COL3, and a fourth column COL4 in FIG. 3, this is merely an example for convenience of description. The number of pixels PXa may be determined according to the resolution of the pixel array 110a.

Each of the pixels PXa may include a microlens ML and two sub pixels, e.g., a first sub pixel SPX1 and a second sub pixel SPX2. A sub pixel, e.g., the first sub pixel SPX1 or the second sub pixel SPX2, may refer to a single photoelectric conversion element or a structure (or a circuit), which includes a single photoelectric conversion element and another element connected to the single photoelectric conversion element one on one. The first sub pixel SPX1 and the second sub pixel SPX2 may be parallel with each other in a row direction, for example, the X-axis direction (e.g., a first direction). For example, the first sub pixel SPX1 may be on the left of each pixel PXa, and the second sub pixel SPX2 may be on the right of each pixel PXa.

First sub pixels SPX1 of the respective pixels PXa may operate in response to a plurality of first transfer control signals TG11, TG21, TG31, and TG41. Second sub pixels SPX2 of the respective pixels PXa may operate in response to a plurality of second transfer control signals TG12, TG22, TG32, and TG42. That each of a first sub pixel SPX1 and a second sub pixel SPX2 operates means that photocharge generated by a photoelectric conversion element (e.g., a first photodiode PD1 or a second photodiode PD2 in FIG. 4A) included in the first sub pixel SPX1 or the second sub pixel SPX2 is transferred to a floating diffusion node FD (in FIG. 4B) of a pixel PXa.

The first transfer control signals TG11, TG21, TG31, and TG41 and the second transfer control signals TG12, TG22, TG32, and TG42 may be separately provided from the row decoder 120 (in FIG. 2) through respective row lines RL. First sub pixels SPX1 of pixels PXa in one row may receive one of the first transfer control signals TG11, TG21, TG31, and TG41 through one row line RL, and second sub pixels SPX2 of pixels PXa in one row may receive one of the second transfer control signals TG12, TG22, TG32, and TG42 through one row line RL. The connection relationship between a row line RL and a sub pixel (e.g., a first sub pixel SPX1 or a second sub pixel SPX2) is denoted by connection CNT in FIG. 3.

During a plurality of readout periods (referred to horizontal periods), a plurality of rows, e.g., the first through fourth rows ROW1 through ROW4, of the pixel array 110a may be sequentially read out. In other words, a plurality of signals may be read out row by row from a plurality of pixels PXa arranged in the first through fourth rows ROW1 through ROW4. For example, pixel signals may be output from pixels PXa in the first row ROW1 during a first readout period, pixel signals may be output from pixels PXa in the second row ROW2 during a second readout period, pixel signals may be output from pixels PXa in the third row ROW3 during a third readout period, and pixel signals may be output from pixels PXa in the fourth row ROW4 during a fourth readout period. However, embodiments are not limited thereto. The order of reading out a plurality of rows may be changed.

The pixel array 110a may be divided into a plurality of pixel groups PG. Each of the pixel groups PG may include at least two pixel patterns of 2×2 matrix adjacent to each other in the Y-axis direction (e.g., a second direction). For example, the pixel group PG may include pixels PXa in a 2×4 matrix, as shown in FIG. 3. Each of the pixel groups PG may be a pixel unit generating autofocus data. For example, autofocus data, e.g., a phase detection signal pair for a phase difference calculation for adjustment of a focus in left and right directions, may be generated based on first image signals (e.g., left image signals) and second image signals (e.g., right image signals) generated by pixels PXa of each pixel group PG. At this time, the first image signals generated by first sub pixels SPX1 may be output from pixels PXa in a certain row among a plurality of rows, e.g., the first through fourth rows ROW1 through ROW4, and the second image signals generated by second sub pixels SPX2 may be output from pixels PXa in another certain row among the rows.

Figure 4A:
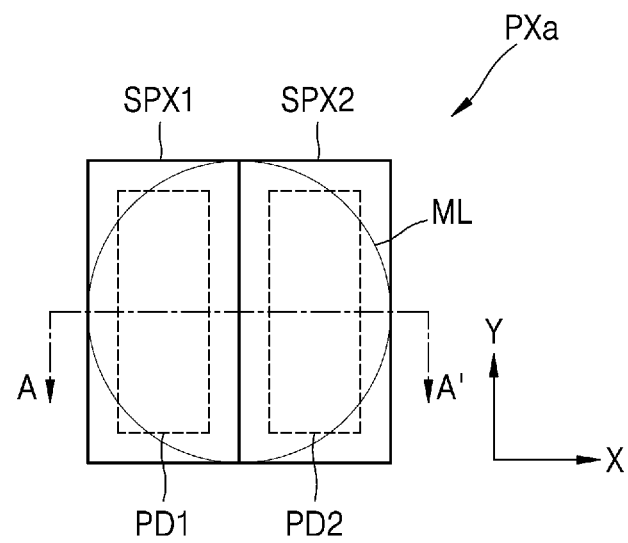
FIGS. 4A and 4B are respectively a front view and a vertical cross-sectional view of a pixel of the pixel array of FIG. 3.
Figure 4B:
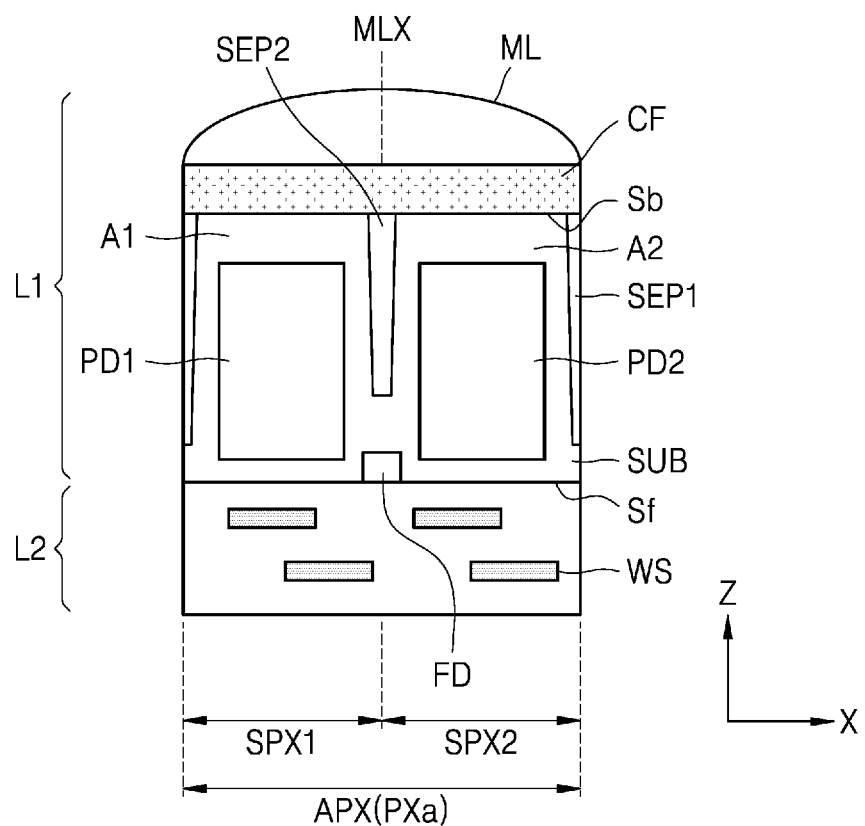

FIGS. 4A and 4B are respectively a front view and a vertical cross-sectional view of a pixel of the pixel array of FIG. 3. FIG. 4B is a vertical cross-sectional view taken along line A-A' in FIG. 4A.

Referring to FIGS. 4A and 4B, a color filter CF and a microlens ML may be on or above the first photodiode PD1 and the second photodiode PD2. A first sub pixel SPX1 may include the first photodiode PD1, and a second sub pixel SPX2 may include the second photodiode PD2.

A pixel PXa may include a first layer L1 and a second layer L2 stacked in the Z-axis direction (e.g., a third direction). The first layer L1 may be referred to as a photoelectric conversion layer and may include the color filter CF and the microlens ML on a substrate SUB and two photoelectric conversion elements, e.g., the first photodiode PD1 and the second photodiode PD2, in the substrate SUB. The second layer L2 may be referred to as a wiring layer. A plurality of wirings WS may be formed in the second layer L2.

The substrate SUB may include a silicon wafer, a silicon-on-insulator (SOI) substrate, or a semiconductor epitaxial layer. The substrate SUB may include a first surface Sf and a second surface Sb, which face each other. For example, the first surface Sf may be a front surface of the substrate SUB, and the second surface Sb may be a back surface of the substrate SUB. Light may incident onto the second surface Sb.

A plurality of pixel separation films (e.g., deep trench isolations (DTIs) or P-type ion implantation regions) are formed in the substrate SUB to extend from the second surface Sb of the substrate SUB toward the first surface Sf of the substrate SUB. A pixel area APX, in which the pixel PXa is formed, is defined by a plurality of first pixel separation films SEP1, which are relatively long among the pixel separation films. The pixel area APX is divided by a second pixel separation film SEP2, which is relatively short among the pixel separation films, into a first area A1 and a second area A2, and the first sub pixel SPX1 and the second sub pixel SPX2 are respectively formed in the first area A1 and the second area A2. In an example embodiment, the first area A1 and the second area A2 may be doped with first conductivity type (e.g., P-type) impurities. The first photodiode PD1 and the second photodiode PD2 may be respectively formed in the first area A1 and the second area A2. For example, well regions doped with second conductivity type (e.g., N-type) impurities may be formed as the first photodiode PD1 and the second photodiode PD2.

As shown in FIG. 4B, the first photodiode PD1 and the second photodiode PD2 may be parallel with each other in the first direction (e.g., the X-axis direction) or the second direction (e.g., the Y-axis direction), with respect to an optical axis MLX of the microlens ML.

The floating diffusion node FD may be formed between the first photodiode PD1 and the second photodiode PD2. In an example embodiment, gate and source terminals (not shown) of transistors (e.g., TX1, TX2, RX, DX, and SX in FIG. 5) may be formed between the first and second photodiodes PD1 and PD2 and the first surface Sf of the substrate SUB. Signals may be transmitted to and received by the transistors (e.g., TX1, TX2, RX, DX, and SX in FIG. 5) through the wirings WS of the second layer L2.

Figure 5:
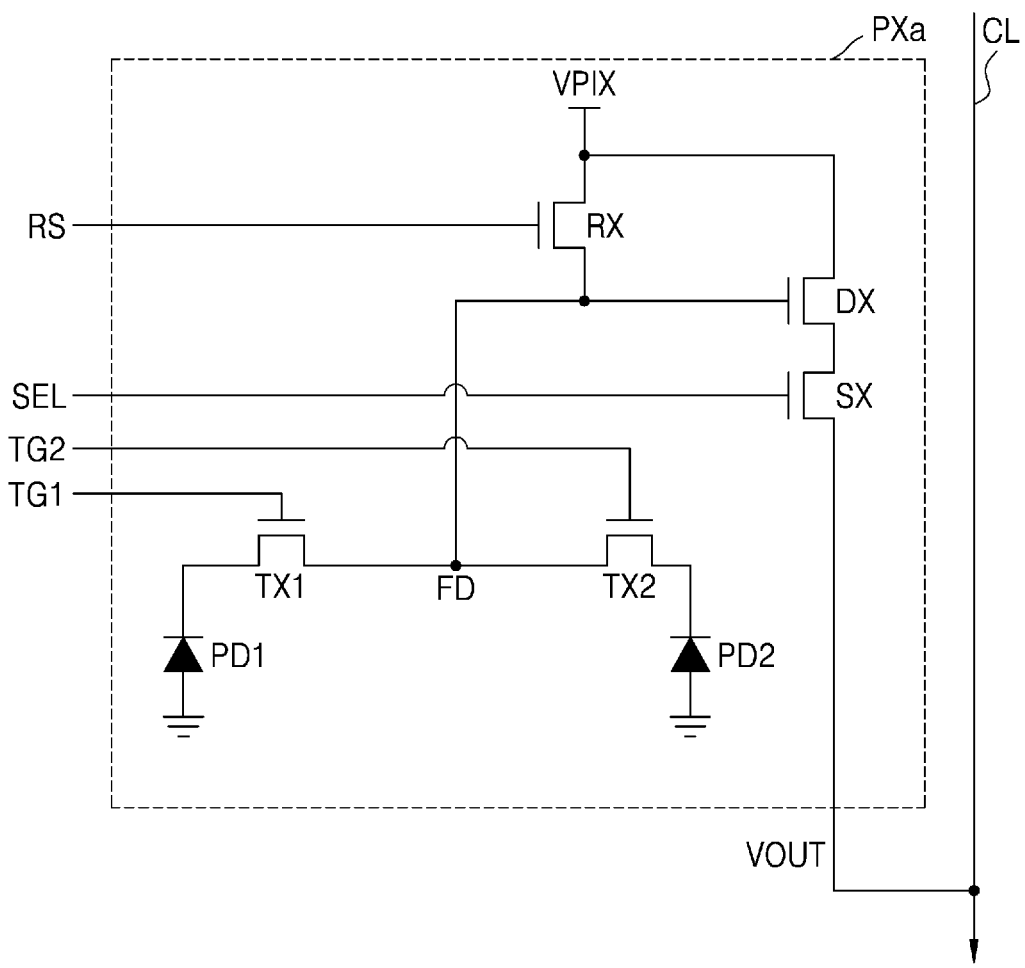
FIG. 5 is an equivalent circuit diagram of the pixel of the pixel array of FIG. 3.

FIG. 5 is an equivalent circuit diagram of the pixel of FIG. 3.

Referring to FIG. 5, the pixel PXa may include the first photodiode PD1, the second photodiode PD2, a first transfer transistor TX1, a second transfer transistor TX2, a reset transistor RX, a drive transistor DX, and a select transistor SX.

The floating diffusion node FD (referred to as a floating diffusion region) may be shared by the first photodiode PD1, the second photodiode PD2, the first transfer transistor TX1, and the second transfer transistor TX2. The first photodiode PD1 and the first transfer transistor TX1 may be referred to as the first sub pixel SPX1, and the second photodiode PD2 and the second transfer transistor TX2 may be referred to as the second sub pixel SPX2.

Each of the first photodiode PD1 and the second photodiode PD2 may generate photocharge of which an amount varies with the intensity of light. For example, each of the first photodiode PD1 and the second photodiode PD2 may include a P-N junction diode and may generate charges, i.e., electrons corresponding to negative charges and holes corresponding to positive charges, in proportion to the amount of incident light. Each of the first photodiode PD1 and the second photodiode PD2 is an example of a photoelectric conversion element and may include at least one selected from a photo transistor, a photogate, a pinned photodiode (PPD), and a combination thereof.

The floating diffusion node FD may operate as a capacitor. When the first transfer transistor TX1 is turned on in response to a first transfer control signal TG1 applied to a gate terminal thereof, charges (e.g., photocharges) generated by the first photodiode PD1 may be transferred to and stored in the floating diffusion node FD. The second transfer transistor TX2 may be turned on in response to a second transfer control signal TG2 applied to a gate terminal thereof and may thus transfer charges generated by the second photodiode PD2 to the floating diffusion node FD. The first transfer control signal TG1 and the second transfer control signal TG2 may be separate signals from each other, and therefore, the turn-on timings of the first transfer transistor TX1 and the second transfer transistor TX2 may be independently controlled by the first transfer control signal TG1 and the second transfer control signal TG2, respectively.

The reset transistor RX may periodically reset charges accumulated in the floating diffusion node FD. A source electrode of the reset transistor RX may be connected to the floating diffusion node FD, and a drain electrode thereof may be connected to a power supply voltage VPIX. When the reset transistor RX is turned on in response to a reset control signal RS applied to a gate terminal thereof, the power supply voltage VPIX connected to the drain electrode of the reset transistor RX is transmitted to the floating diffusion node FD. When the reset transistor RX is turned on, charges accumulated in the floating diffusion node FD are discharged such that the floating diffusion node FD may be reset.

The drive transistor DX may operate as a source follower. The drive transistor DX may receive a signal, which corresponds to the amount of charges in the floating diffusion node FD, i.e., a potential of the floating diffusion node FD, through a gate terminal thereof and may buffer and output the received signal. The select transistor SX may be turned on in response to a select signal SEL applied to a gate terminal thereof. When the select transistor SX is turned on, the buffered signal output from the drive transistor DX may be output as a pixel signal VOUT through a column line CL.

Figure 6:
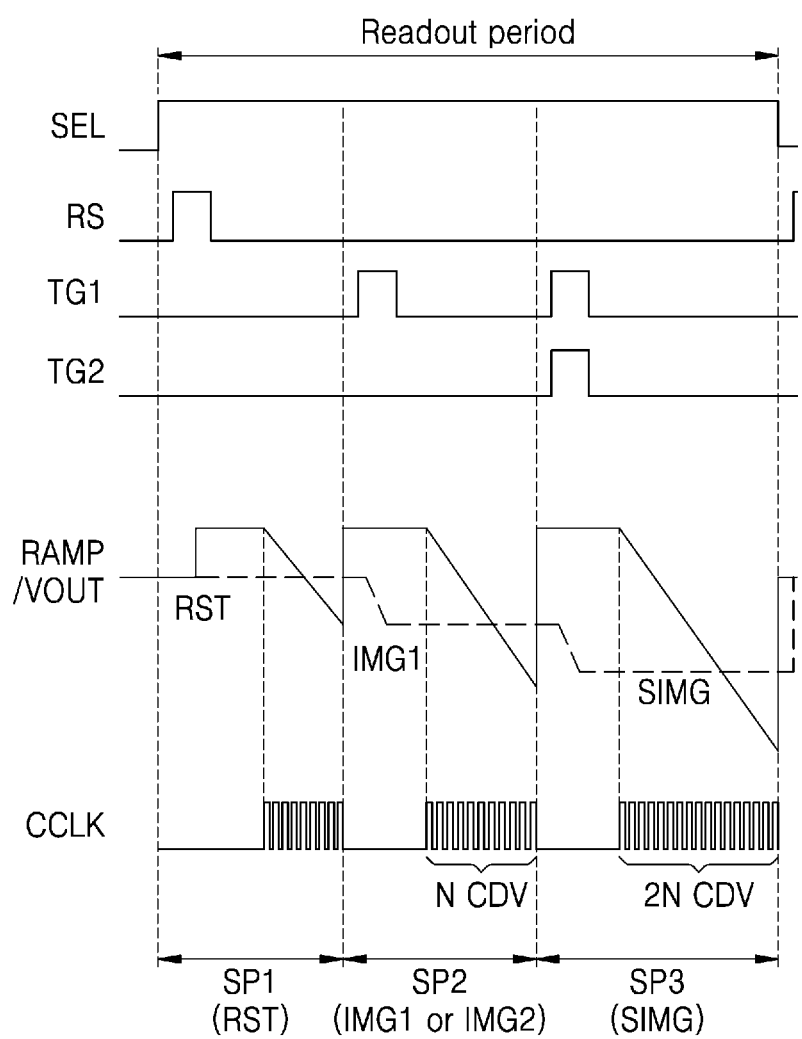
FIG. 6 is a timing diagram of an image sensor that reads a pixel signal from the pixel of FIG. 5, according to an example embodiment.

FIG. 6 is a timing diagram of the image sensor 100 that reads a pixel signal from the pixel of FIG. 5, according to an example embodiment.

A plurality of pixel signals VOUT may be read out from a plurality of pixels PXa in one row of the pixel array 110a (in FIG. 3) during a readout period (referred to as a horizontal period). In other words, the pixel signals VOUT may be output from the pixels PXa in one row and may undergo analog-to-digital conversion in the readout circuit, e.g., the comparator circuit 140 and the counter circuit 160 in FIG. 2, so that pixel values, which are digital values, may be generated from the pixel signals VOUT.

Referring to FIG. 6, the readout period may be divided into first sub period SP!, second sub period SP2, and third sub period SP3 according to a signal, which is output from a pixel PXa and undergoes analog-to-digital conversion. A reset signal RST (e.g., a reset voltage) corresponding to a reset level may be output as a pixel signal VOUT during the first sub period SP1. A first image signal IMG1 (e.g., a first signal voltage) generated by the first photodiode PD1 of the pixel PXa or a second image signal IMG2 (e.g., a second signal voltage) generated by the second photodiode PD2 of the pixel PXa may be output as the pixel signal VOUT during the second sub period SP2. A sum image signal SIMG (e.g., a sum signal voltage) generated by the first photodiode PD1 and the second photodiode PD2 of the pixel PXa may be output as the pixel signal VOUT during the third sub period SP3.

The reset level may be different among a plurality of pixels PXa and may also vary with time in even one pixel PXa. Accordingly, the reset signal RST may be read out first from the pixel PXa during the readout period, and then the reset signal RST may be subtracted from (or added to) image signals e.g., the first image signal IMG1 (or the second image signal IMG2) and the sum image signal SIMG, which are read out subsequently. Consequently, actual image signals may be obtained, and a variation among image signals output from a plurality of pixels PXa may be reduced.

As described above, the reset signal RST, the first image signal IMG1 (or the second image signal IMG2), and the sum image signal SIMG generated by a pixel PXa may be sequentially read out during the readout period. This readout method may be referred to as a reset-signal-signal (RSS) readout method.

In detail, referring to FIGS. 5 and 6, the select signal SEL may be at an active level, e.g., logic high, during the readout period. The select transistor SX may be turned on in response to the select signal SEL and connected to the column line CL of the pixel PXa. At this time, the active level of a signal may refer to a level that enables a transistor, to which the signal is applied, to be turned on. In an example embodiment, it is assumed that logic high is an active level and logic low is an inactive level.

When the readout period starts, the reset control signal RS transitions from logic low to logic high, and accordingly, the reset transistor RX is turned on so that the floating diffusion node FD may be reset. During the first sub period SP1, the reset signal RST corresponding to the reset level of the floating diffusion node FD may be output as the pixel signal VOUT through the column line CL, and the comparator 141 (in FIG. 2) connected to the column line CL may compare the ramp signal RAMP with the pixel signal VOUT and output a comparison result as a comparison signal. The level of the ramp signal RAMP decreases with a certain slope. When the level of the ramp signal RAMP is lower than the level of the pixel signal VOUT, the level of the comparison signal may transition. During the first sub period SP1, the comparator 141 may compare the ramp signal RAMP with the reset signal RST received as the pixel signal VOUT and output the comparison signal.

The counter 161 (in FIG. 2) may count the pixel signal VOUT based on the counting clock signal CCLK. In detail, the counter 161 may count the reset signal RST by counting the comparison signal starting from when the level of the ramp signal RAMP decreases to when the level of the comparison signal transitions, i.e., when the level of the ramp signal RAMP is the same as the level of the pixel signal VOUT. In an example embodiment, the counter 161 may receive, as the counting clock signal CCLK, a gray code having code values sequentially increasing and may output, as a count value, a code value corresponding to a time of when the level of the comparison signal transitions.

During the first sub period SP1, the reset signal RST may be counted, and a count value (hereinafter, referred to as a reset value) corresponding to the level of the reset signal RST may be stored in an internal latch (or memory) of the counter 161 or a memory 162 in FIG. 2. The reset signal RST may hereby be read during the first sub period SP1.

During the second sub period SP2, as the first transfer control signal TG1 transitions to an active level, charges generated by the first photodiode PD1 may be transferred to and stored in the floating diffusion node FD. Based on a potential of the floating diffusion node FD according to the amount of charges received from the first photodiode PD1, the drive transistor DX may output the first image signal IMG1, and the first image signal IMG1 may be output as the pixel signal VOUT through the column line CL.

The comparator 141 may compare the first image signal IMG1 with the ramp signal RAMP. The counter 161 may count the first image signal IMG1 by counting a comparison signal, which is output from the comparator 141, based on the counting clock signal CCLK. The first image signal IMG1 may be read out by generating a count value (hereinafter, referred to as a first image signal value) corresponding to the level of the first image signal IMG1.

During the third sub period SP3, as the first transfer control signal TG1 and the second transfer control signal TG2 transition to an active level, charges generated by the first photodiode PD1 and the second photodiode PD2 may be transferred to and stored in the floating diffusion node FD. Based on a potential of the floating diffusion node FD according to the amount of charges, the drive transistor DX may output the sum image signal SIMG, and the sum image signal SIMG may be output as the pixel signal VOUT through the column line CL.

The comparator 141 may compare the sum image signal SIMG with the ramp signal RAMP. The counter 161 may count the sum image signal SIMG by counting a comparison signal, which is output from the comparator 141, based on the counting clock signal CCLK. The sum image signal SIMG may be read out by generating a count value (hereinafter, referred to as a sum image signal value) corresponding to the level of the sum image signal SIMG.

Because the first image signal IMG1 is generated by one photodiode, e.g., the first photodiode PD1, and the sum image signal SIMG is generated by two photodiodes, e.g., the first and second photodiodes PD1 and PD2, a signal range (e.g., a voltage range) of the sum image signal SIMG may be wider than a signal range of the first image signal IMG1. For example, the signal range of the sum image signal SIMG may be double the signal range of the first image signal IMG1. Accordingly, the range of code values (i.e., the number of clocks that toggle) provided as the counting clock signal CCLK during the third sub period SP3 may be wider than the range of code values provided during the second sub period SP2. For example, the comparator 141 may count a comparison signal based on N code values CDV during the second sub period SP2 and may count a comparison signal based on 2N code values CDV during the third sub period SP3.

Figure 7:
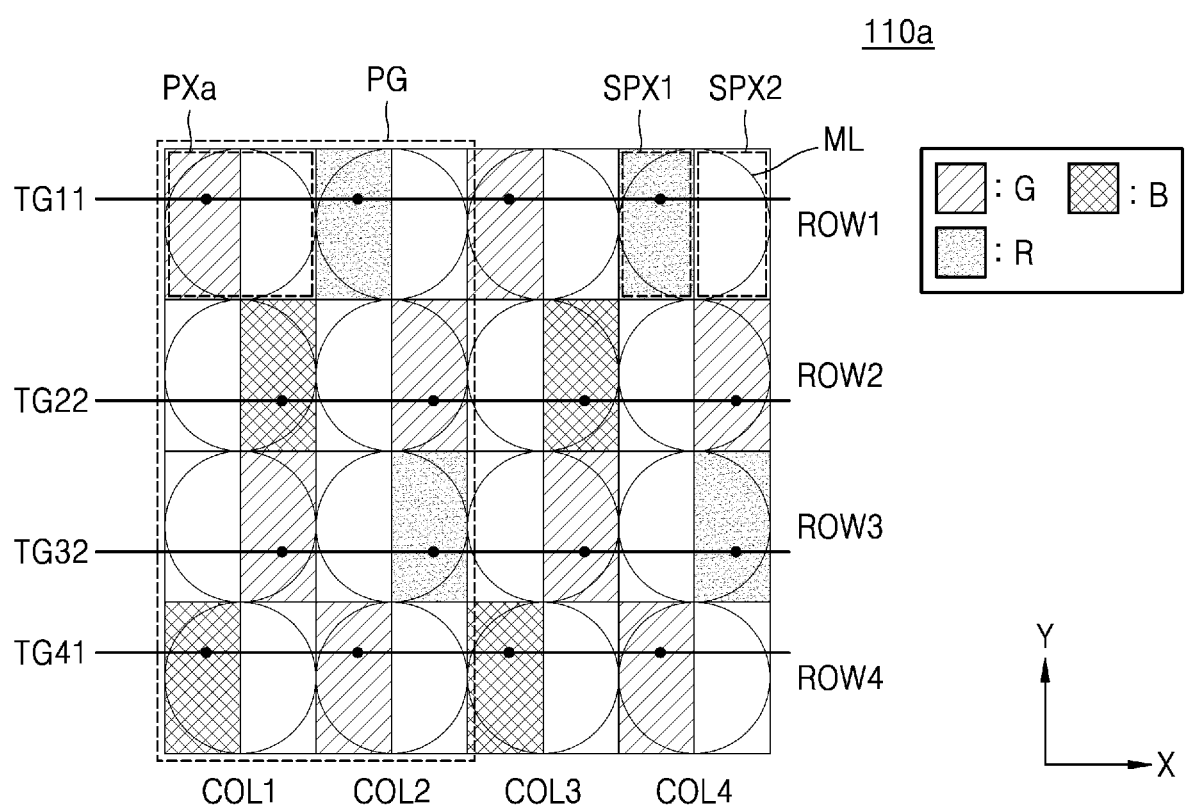
FIG. 7 illustrates a method of outputting an image signal for generating autofocus data from a pixel array, according to an example embodiment.

FIG. 7 illustrates a method of outputting an image signal for generating autofocus data from a pixel array, according to an example embodiment.

Referring to FIG. 7, a first image signal (e.g., an image signal corresponding to photocharge generated by the first photodiode PD1) may be read from a first sub pixel SPX1 on the left of each of pixels PXa in certain rows among a plurality of rows, e.g., the first through fourth rows ROW1 through ROW4. A second image signal (e.g., an image signal corresponding to photocharge generated by the second photodiode PD2) may be read from a second sub pixel SPX2 on the right of each of pixels PXa in other certain rows among the plurality of rows. Autofocus data may be generated based on the first image signal and the second image signal, i.e., the first image signal value and the second image signal value.

In an example embodiment, in each of the pixels PXa in the first row ROW1 and the fourth row ROW4, a first image signal may be output from the first sub pixel SPX1 in response to a first transfer control signal TG11 or TG41. In each of the pixels PXa in the second row ROW2 and the third row ROW3, a second image signal may be output from the second sub pixel SPX2 in response to a second transfer control signal TG22 or TG32.

In an example embodiment, in each of the pixels PXa in the first row ROW1 and the second row ROW2, a first image signal may be output from the first sub pixel SPX1 in response to a first transfer control signal TG11 or TG21. In each of the pixels PXa in the third row ROW3 and the fourth row ROW4, a second image signal may be output from the second sub pixel SPX2 in response to a second transfer control signal TG32 or TG42.

For example, a first image signal (e.g., a first red image signal) may be output from the first sub pixel SPX1 of a red pixel R in the first row ROW1, and a second image signal (e.g., a second red image signal) may be output from the second sub pixel SPX2 of a red pixel R in the third row ROW3. A phase detection signal pair corresponding to the red pixels R of a pixel group PG may be generated based on the first red image signal and the second red image signal.

A second image signal (e.g., a second blue image signal) may be output from the second sub pixel SPX2 of a blue pixel B in the second row ROW2, and a first image signal (e.g., a first blue image signal) may be output from the first sub pixel SPX1 of a blue pixel B in the fourth row ROW4. A phase detection signal pair corresponding to the blue pixels B of the pixel group PG may be generated based on the first blue image signal and the second blue image signal.

In this manner, autofocus data may be generated based on a plurality of first image signals and a plurality of second image signals, which are output from a plurality of pixel groups PG of the pixel array 110a.

Figure 8:
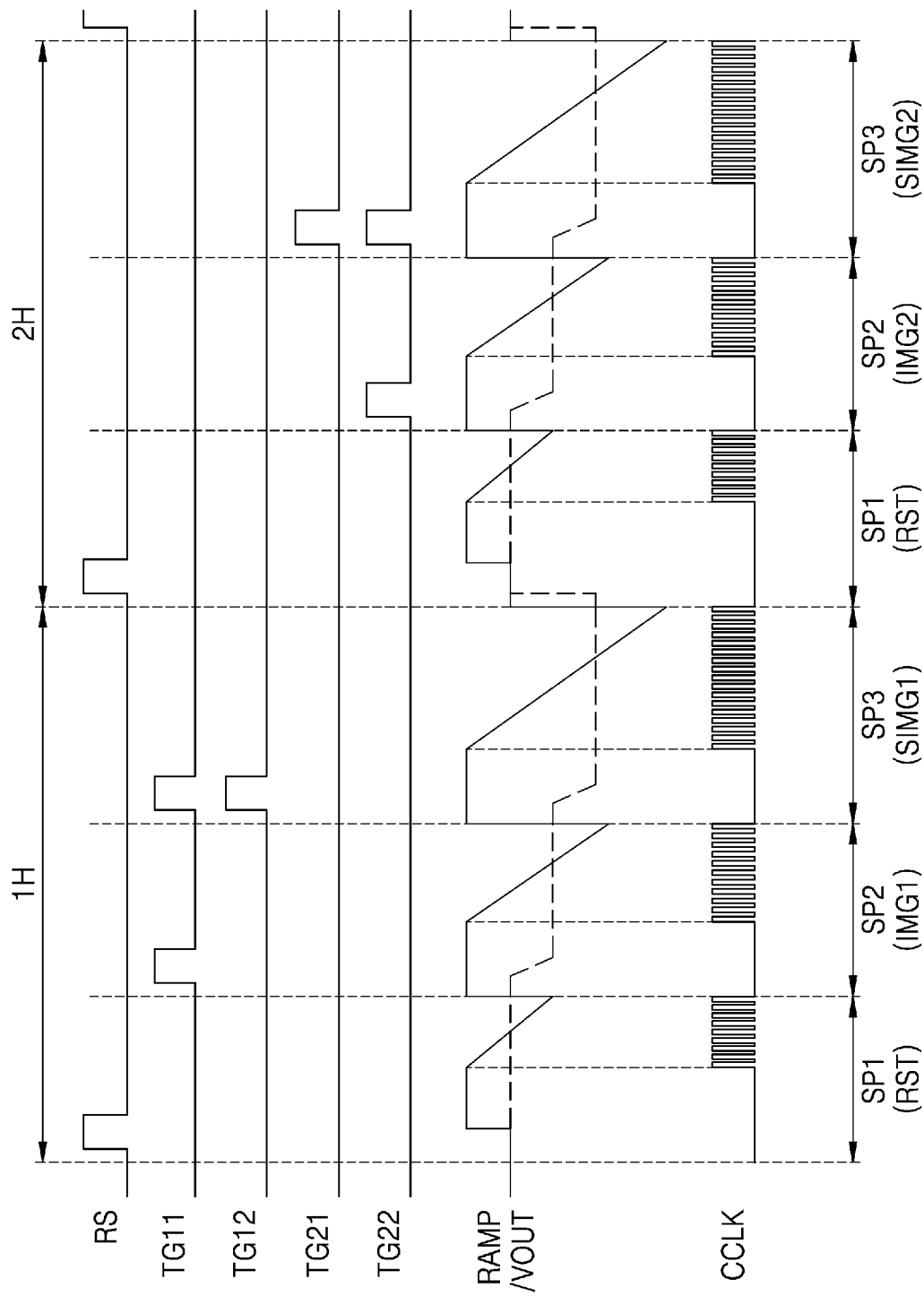
FIG. 8 is a timing diagram of an image sensor that reads a pixel signal from a pixel, according to an example embodiment.
Figure 9:
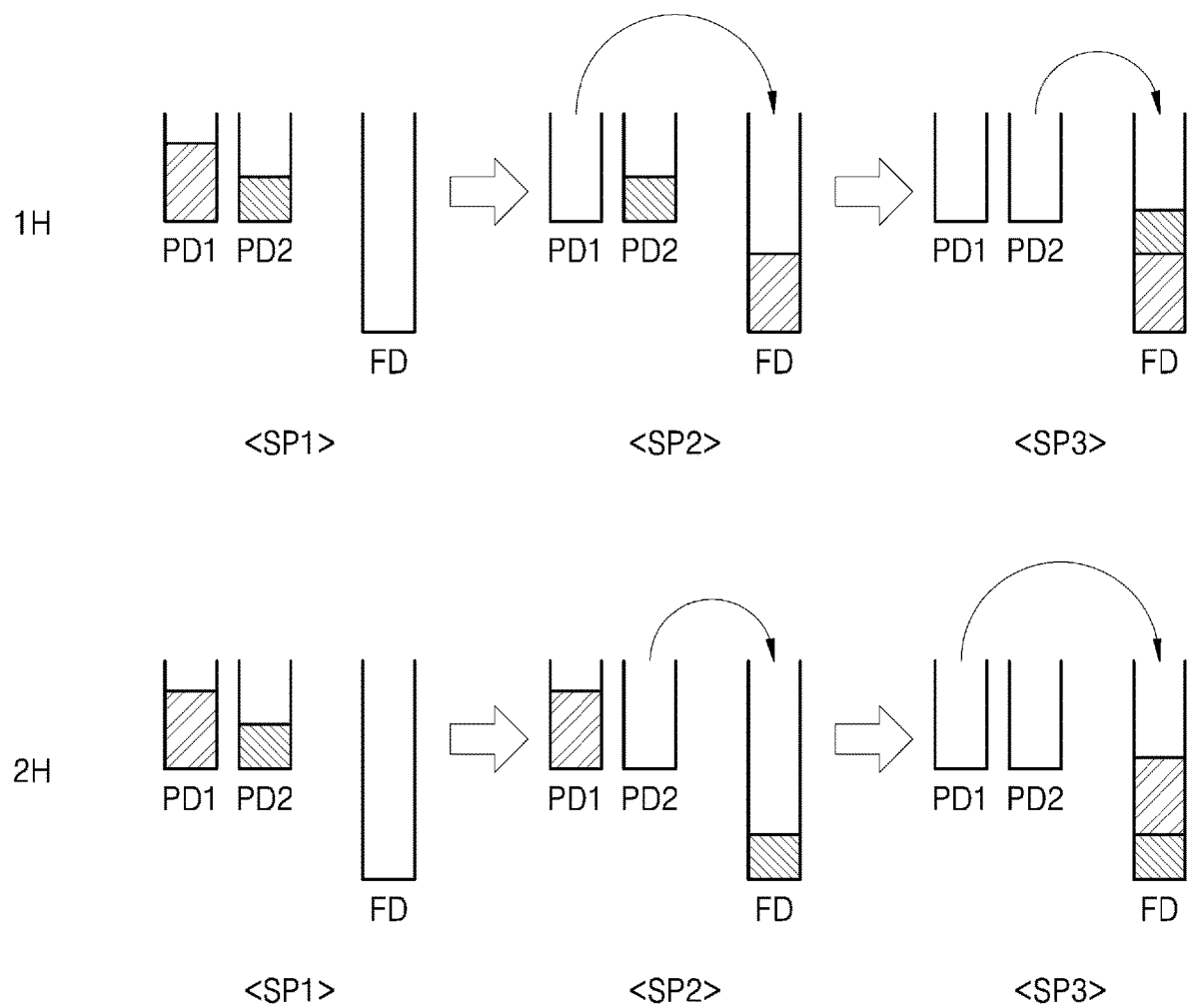
FIG. 9 illustrates photocharge transfer in pixels according to transfer control signals in FIG. 8.

FIG. 8 is a timing diagram of an image sensor that reads a pixel signal from a pixel, according to an example embodiment. FIG. 9 illustrates photocharge transfer in pixels according to transfer control signals in FIG. 8. For convenience of description, FIG. 8 shows the reset control signal RS, first and second transfer control signals TG11, TG12, TG21, and TG22, the ramp signal RAMP, the pixel signal VOUT, and the counting clock signal CCLK during two readout periods, e.g., a first readout period 1H and a second readout period 2H. The method of reading an image signal from a pixel PXa, which has been described above with reference to FIG. 6, may be applied to an example embodiment.

Referring to FIGS. 3, 5, and 8, a pixel PXa (hereinafter, referred to as a first pixel) in one row, e.g., the first row ROW1, of the pixel array 110a may output a pixel signal VOUT during the first readout period 1H, and a pixel PXa (hereinafter, referred to as a second pixel) in another row, e.g., the second row ROW2, of the pixel array 110a may output a pixel signal VOUT during the second readout period 2H.

During respective first sub periods SP1 of the first readout period 1H and the second readout period 2H, respective reset transistors RX of the first and second pixels may be turned on in response to the reset signal RST and may thus respectively reset floating diffusion nodes FD, as shown in FIG. 9. The first and second pixels may respectively output reset signals according to the floating diffusion nodes FD that have been reset. The reset signals of the first and second pixels may be output and counted as the pixel signals VOUT.

During the second sub period SP2 of the first readout period 1H, as the first transfer transistor TX1 of the first pixel is turned on in response to the first transfer control signal TG11, charges (or photocharges) generated by the first photodiode PD1 may be transferred to the floating diffusion node FD. The first pixel may output the first image signal IMG1, e.g., a left image signal, corresponding to the charges stored in the floating diffusion node FD. Accordingly, the first image signal IMG1 may be output from the first photodiode PD1 (or the first sub pixel SPX1) of the first pixel and counted.

During the third sub period SP3 of the first readout period 1H, the first transfer transistor TX1 and the second transfer transistor TX2 of the first pixel may be respectively turned on in response to the first transfer control signal TG11 and the second transfer control signal TG12, and charges generated by the second photodiode PD2 (and charges remaining in the first photodiode PD1) may be transferred to and stored in the floating diffusion node FD. The charges transferred from the first photodiode PD1 during the second sub period SP2 and the charges transferred from the second photodiode PD2 during the third sub period SP3 may be stored in the floating diffusion node FD. The first pixel may output a sum image signal, e.g., a first sum image signal SIMG1, corresponding to the charges stored in the floating diffusion node FD. Accordingly, the first sum image signal SIMG1 may be output from the first pixel and counted. Although it is shown in FIG. 9 that the charges transferred from the second photodiode PD2 are stored in the floating diffusion node FD during the third sub period SP3, it is merely for brevity of description and the charges remaining in the first photodiode PD1 may also be transferred to and stored in the floating diffusion node FD during the third sub period SP3.

During the second sub period SP2 of the second readout period 2H, as the second transfer transistor TX2 of the second pixel is turned on in response to the second transfer control signal TG22, charges (or photocharges) generated by the second photodiode PD2 may be transferred to the floating diffusion node FD. The second pixel may output the second image signal IMG2, e.g., a right image signal, corresponding to the charges stored in the floating diffusion node FD. Accordingly, the second image signal IMG2 may be output from the second photodiode PD2 (or the second sub pixel SPX2) of the second pixel and counted.

During the third sub period SP3 of the second readout period 2H, the first transfer transistor TX1 and the second transfer transistor TX2 of the second pixel may be respectively turned on in response to the first transfer control signal TG21 and the second transfer control signal TG22, and charges generated by the first photodiode PD1 and charges generated by the second photodiode PD2 may be transferred to and stored in the floating diffusion node FD. The second pixel may output a sum image signal, e.g., a second sum image signal SIMG2, corresponding to the charges stored in the floating diffusion node FD. Accordingly, the second sum image signal SIMG2 may be output from the second pixel and counted.

As described above, a pixel PXa, e.g., the first pixel, in the first row ROW1 may output the first image signal IMG1, e.g., the left image signal, in response to the first transfer control signal TG11 during the second sub period SP2 of the first readout period 1H; and a pixel PXa, e.g., the second pixel, in the second row ROW2 may output the second image signal IMG2, e.g., the right image signal, in response to the second transfer control signal TG22 during the second sub period SP2 of the second readout period 2H.

An example in which the pixel signal VOUT is read from the first row ROW1 during the first readout period 1H and the pixel signal VOUT is read from the second row ROW2 during the second readout period 2H has been described with reference to FIG. 8. However, embodiments are not limited thereto. For example, a pixel signal VOUT may be read from the first or fourth row ROW1 or ROW4 in FIG. 3 during the first readout period 1H, and a pixel signal VOUT may be read from the second or third row ROW2 or ROW3 during the second readout period 2H. Alternatively, a pixel signal VOUT may be read from the first or second row ROW1 or ROW2 in FIG. 3 during the first readout period 1H, and a pixel signal VOUT may be read from the third or fourth row ROW3 or ROW4 during the second readout period 2H.

As described above, according to an example embodiment, in the image sensor 100 and an operating method thereof, each of a plurality of pixels PX of the pixel array 110 may include at least two photoelectric conversion elements, e.g., the first photodiode PD1 and the second photodiode PD2, which are parallel with each other. Each pixel in a certain row may output a first image signal generated from a first photoelectric conversion element and each pixel in another certain row may output a second image signal generated from a second photoelectric conversion element. Autofocus data for an AF function may be generated based on a first image signal value and a second image signal value, which are obtained by respectively converting the first image signal and the second image signal into digital values.

In a comparative example, a pixel PX outputs a first image signal, e.g., a left image signal, and a sum image signal, and a second image signal value is calculated by subtracting a first image signal value corresponding to the first image signal from a sum image signal value corresponding to the sum image signal. In this case, in order to prevent signal distortion from occurring in the second image signal value, the sum image signal may be counted, during readout of the sum image signal, based on a greater number of code values than the number of code values needed to count the sum image signal. An increase in the number of code values may indicate an increase in a readout time, and accordingly, a time taken for an image signal output from a pixel to be converted into a digital value may increase.

However, according to an example embodiment, in an operating method of the image sensor 100, a first image signal and a second image signal may be read from at least two adjacent pixels of the same color, and autofocus data for an AF function may be generated based on the read first image signal and the read second image signal, i.e., a first image signal value and a second image signal value. Therefore, a time taken for each of the first and second image signals to be converted into a digital value without signal distortion may be decreased, and accordingly, the frame rate of the image sensor 100 may be increased. In addition, because a plurality of pixels PX of the pixel array 110, e.g., all pixels PX of the pixel array 110, may be used for generation of autofocus data, highly accurate autofocus data may be generated. Therefore, an imaging device (e.g., the digital imaging device 1000 of FIG. 1) including the image sensor 100 may perform high-speed autofocus.

Figure 10A:
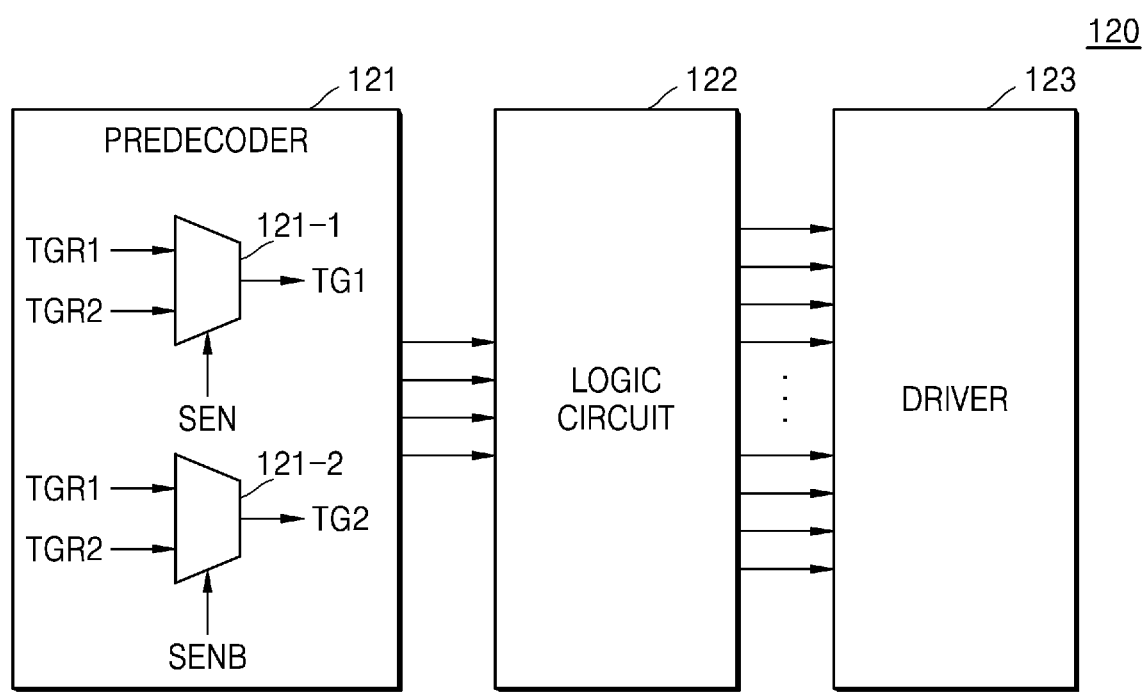

FIGS. 10A and 10B are respectively a schematic block diagram and a schematic timing diagram of the row decoder 120, according to an example embodiment.

Referring to FIG. 10A, the row decoder 120 may include a predecoder 121, a logic circuit 122, and a driver 123.

The predecoder 121 may generate control signals, e.g., a reset control signal, a transfer control signal, and a select signal, provided to the pixel array 110 (in FIG. 2). The predecoder 121 may generate a first reference control signal TGR1 and a second reference control signal TGR2 and may generate a first transfer control signal TG1 and a second transfer control signal TG2 based on the first reference control signal TGR1 and the second reference control signal TGR2.

The predecoder 121 may include a first multiplexer 121-1 and a second multiplexer 121-2. The first multiplexer 121-1 may receive the first reference control signal TGR1 and the second reference control signal TGR2 and select one of the first reference control signal TGR1 and the second reference control signal TGR2 as the first transfer control signal TG1 based on a swapping enable signal SEN. The second multiplexer 121-2 may select one of the first reference control signal TGR1 and the second reference control signal TGR2 as the second transfer control signal TG2 based on a swapping enable bar signal SENB. The swapping enable bar signal SENB may have an opposite phase to the swapping enable signal SEN. Accordingly, one of the first and second reference control signals TGR1 and TGR2 may be selected as the first transfer control signal TG1 by the first multiplexer 121-1, and the other one of the first and second reference control signals TGR1 and TGR2 may be selected as the second transfer control signal TG2 by the second multiplexer 121-2.

Referring to FIG. 10B, the first reference control signal TGR1 and the second reference control signal TGR2 may toggle from a first level, e.g., logic low, to a second level, e.g., logic high, at least once during a readout period, e.g., the first readout period 1H or the second readout period 2H. The first reference control signal TGR1 may toggle earlier than the second reference control signal TGR2. For example, the first reference control signal TGR1 may toggle during the second sub period SP2. The second reference control signal TGR2 may toggle during the third sub period SP3. In an example embodiment, the first reference control signal TGR1 may also toggle during the third sub period SP3.

The swapping enable signal SEN may be at the first level, e.g., logic low, in the first readout period 1H. The first multiplexer 121-1 may output the first reference control signal TGR1 as the first transfer control signal TG1 in response to the swapping enable signal SEN, and the second multiplexer 121-2 may output the second reference control signal TGR2 as the second transfer control signal TG2 in response to the swapping enable bar signal SENB.

The swapping enable signal SEN may be at the second level, e.g., logic high, in the second readout period 2H. The first multiplexer 121-1 may output the second reference control signal TGR2 as the first transfer control signal TG1 in response to the swapping enable signal SEN, and the second multiplexer 121-2 may output the first reference control signal TGR1 as the second transfer control signal TG2 in response to the swapping enable bar signal SENB.

The logic circuit 122 may generate a reset control signal, a transfer control signal, and a select signal for each row of the pixel array 110a of FIG. 3 based on control signals, e.g., a reset control signal, a transfer control signal, and a select signal, received from the predecoder 121. For example, the logic circuit 122 may, based on the first transfer control signal TG1 and the second transfer control signal TG2, which are received from the predecoder 121, generate the first transfer control signal TG11 and the second transfer control signal TG12, which are applied to the first row ROW1 in the first readout period 1H, and the first transfer control signal TG21 and the second transfer control signal TG22, which are applied to the second row ROW2 in the second readout period 2H.

The driver 123 may level shift the control signals, e.g., the reset control signal, the transfer control signal, and the select signal, which are received from the logic circuit 122 for each row, based on a power supply voltage corresponding to an active level or an inactive level and may output level-shifted control signals to the pixel array 110a.

Figure 11A:
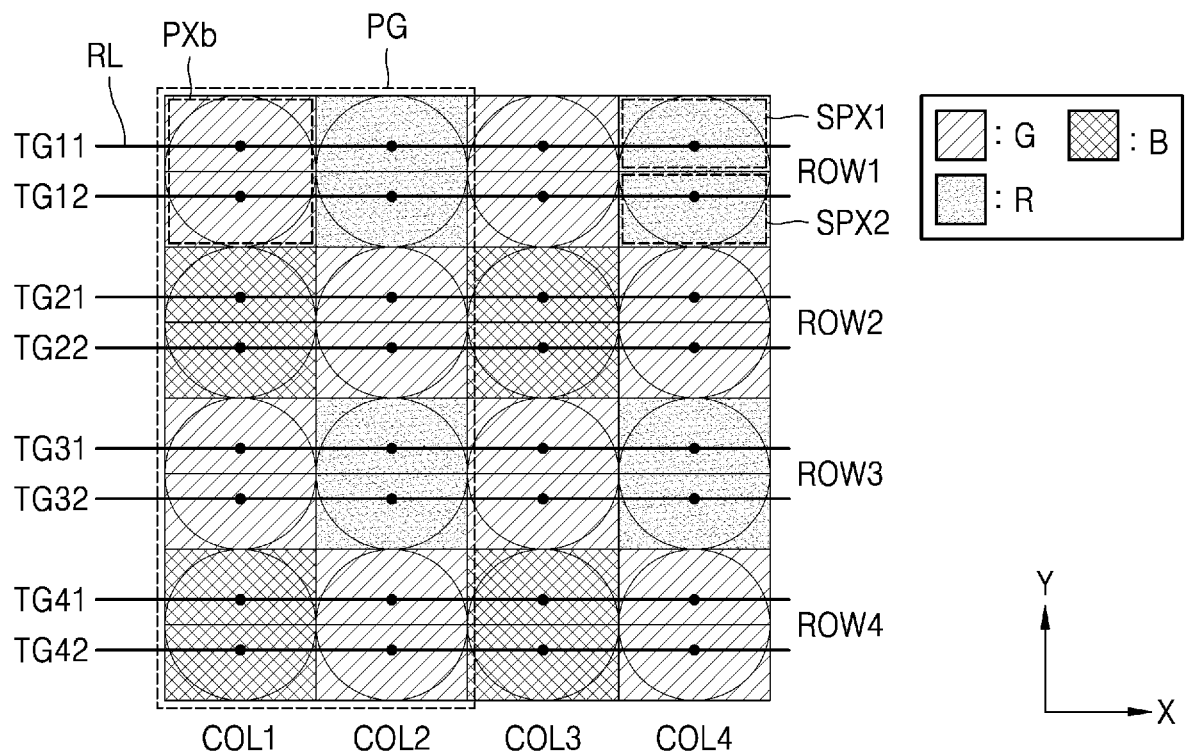
FIG. 11A illustrates a pixel array according to an example embodiment.
Figure 11B:
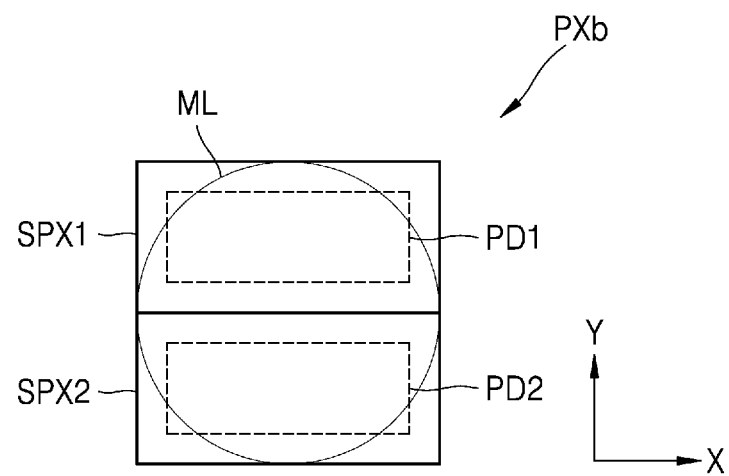
FIG. 11B is a front view of a pixel of the pixel array of FIG. 11A.

FIG. 11A illustrates a pixel array according to an example embodiment, and FIG. 11B is a front view of a pixel of the pixel array of FIG. 11A. A pixel array 110b of FIG. 11A may be a modification of the pixel array 110a of FIG. 3. Accordingly, the pixel array 110b will be described, focusing on differences from the pixel array 110a.

Referring to FIGS. 11A and 11B, each of a plurality of pixels PXb may include a microlens ML and two sub pixels, e.g., a first sub pixel SPX1 and a second sub pixel SPX2. The first sub pixel SPX1 and the second sub pixel SPX2 may be parallel with each other in a column direction, for example, the Y-axis direction (e.g., the second direction). For example, the first sub pixel SPX1 may be in a top of each pixel PXb, and the second sub pixel SPX2 may be in a bottom of each pixel PXb. The first sub pixel SPX1 and the second sub pixel SPX2 may respectively include the first photodiode PD1 and the second photodiode PD2.

First sub pixels SPX1 of the respective pixels PXb may operate in response to a plurality of first transfer control signals TG11, TG21, TG31, and TG41. Second sub pixels SPX2 of the respective pixels PXb may operate in response to a plurality of second transfer control signals TG12, TG22, TG32, and TG42.

As described above with reference to FIGS. 3 through 9, a pixel signal may be read from the pixel array 110b. First image signals generated by first sub pixels SPX1 may be output from pixels PXb in a certain row among the first through fourth rows ROW1 through ROW4, and second image signals generated by second sub pixels SPX2 may be output from pixels PXb in another certain row among the first through fourth rows ROW1 through ROW4. Autofocus data, e.g., a phase detection signal pair for a phase difference calculation for adjustment of a focus in a vertical direction, may be generated based on the first image signals (e.g., top image signals) and the second image signals (e.g., bottom image signals).

Figure 12:
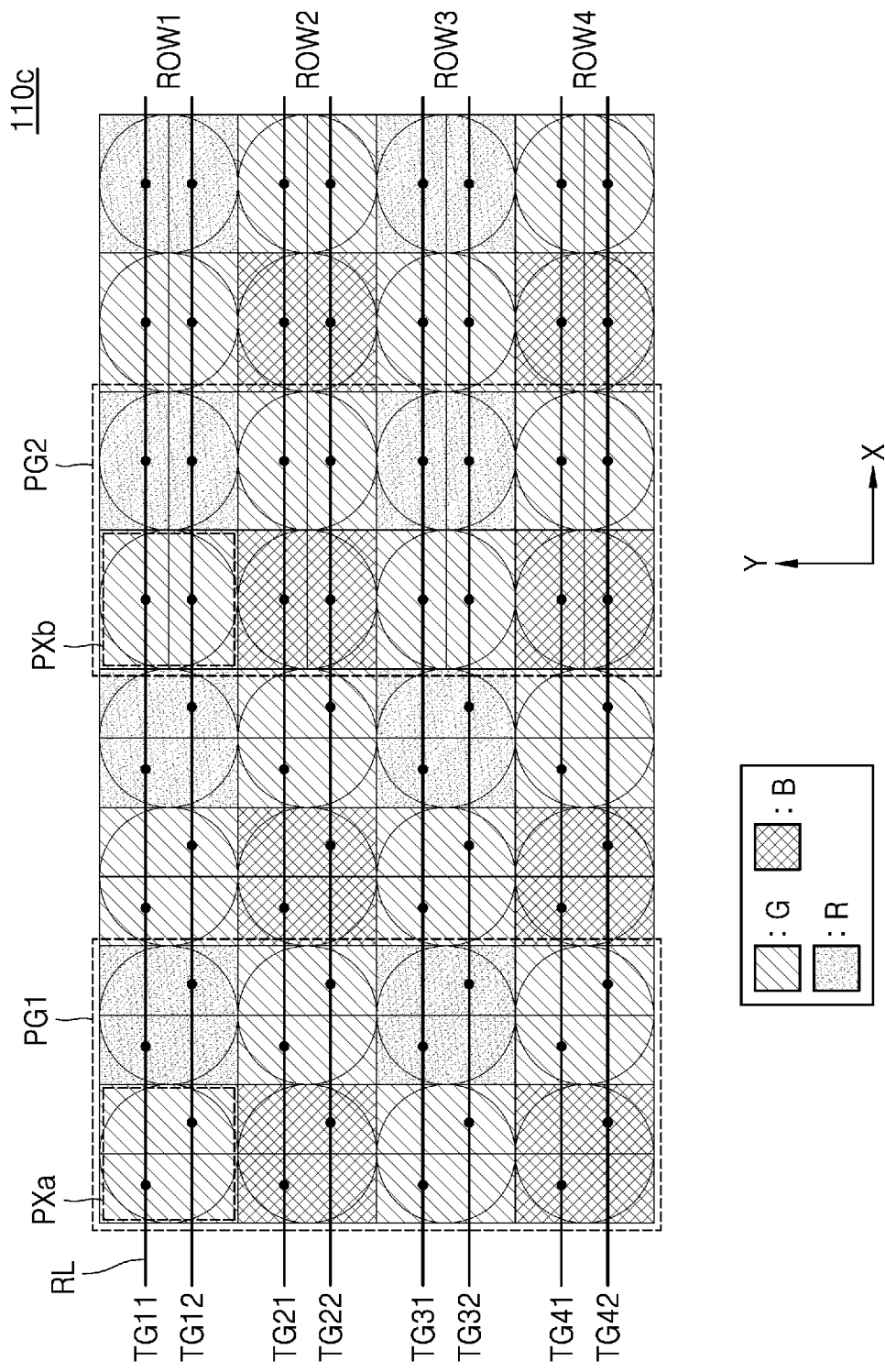
FIG. 12 illustrates a pixel array according to an example embodiment.

FIG. 12 illustrates a pixel array according to an example embodiment. A pixel array 110c of FIG. 12 may be a modification of the pixel array 110a of FIG. 3 and the pixel array 110b of FIG. 11A. Accordingly, the pixel array 110c will be described, focusing on differences from the pixel arrays 110a and 110b.

Referring to FIG. 12, the pixel array 110c may include a plurality of first-type pixels PXa each including a first sub pixel SPX1 and a second sub pixel SPX2, which are parallel with each other in the row direction, for example, the X-axis direction (e.g., the first direction), and a plurality of second-type pixels PXb each including a first sub pixel SPX1 and a second sub pixel SPX2, which are parallel with each other in the column direction, for example, the Y-axis direction (e.g., the second direction). First-type pixels PXa and second-type pixels PXb may be arranged in one row. The first-type pixels PXa and the second-type pixels PXb in one row, e.g., the first row ROW1, may receive the first transfer control signal TG11 through the same row line RL and receive the second transfer control signal TG12 through the same row line RL.

The pixel array 110c may be divided into a plurality of first pixel groups PG1 and a plurality of second pixel groups PG2. A first pixel group PG1 may include first-type pixels PXa in a 2×4 matrix, and a second pixel group PG2 may include second-type pixels PXb in a 2×4 matrix.

A pixel signal may be read from the pixel array 110c. First image signals generated by first sub pixels SPX1 may be output from first-type pixels PXa in a certain row among the first through fourth rows ROW1 through ROW4, and third image signals generated by first sub pixels SPX1 may be output from second-type pixels PXb in the certain row. Second image signals generated by second sub pixels SPX2 may be output from first-type pixels PXa in another certain row among the first through fourth rows ROW1 through ROW4, and fourth image signals generated by second sub pixels SPX2 may be output from second-type pixels PXb in the another row. A first image signal and a second image signal may respectively correspond to a left image signal and a right image signal, and a third image signal and a fourth image signal may respectively correspond to a top image signal and a bottom image signal.

A phase detection signal pair for a phase difference calculation for adjustment of a focus in the left and right directions may be generated based on first image signals and second image signals, which are generated by the first-type pixels PXa of the first pixel group PG1. A phase detection signal pair for a phase difference calculation for adjustment of a focus in the vertical direction may be generated based on third image signals and fourth image signals, which are generated by the second-type pixels PXb of the second pixel group PG2.

Although it is described in FIG. 12 that the pixel array 110c includes the first-type pixel PXa, in which the first sub pixel SPX1 and the second sub pixel SPX2 are parallel with each other in the row direction, and the second-type pixel PXb, in which the first sub pixel SPX1 and the second sub pixel SPX2 are parallel with each other in the column direction, embodiments are not limited thereto. In an example embodiment, the pixel array 110c may include a third-type pixel, in which a first sub pixel SPX1 and a second sub pixel SPX2 are arranged in a left-upward direction (or a right-downward direction), and a fourth-type pixel, in which a first sub pixel SPX1 and a second sub pixel SPX2 are arranged in a right-upward direction (or a left-downward direction).

Figure 13A:
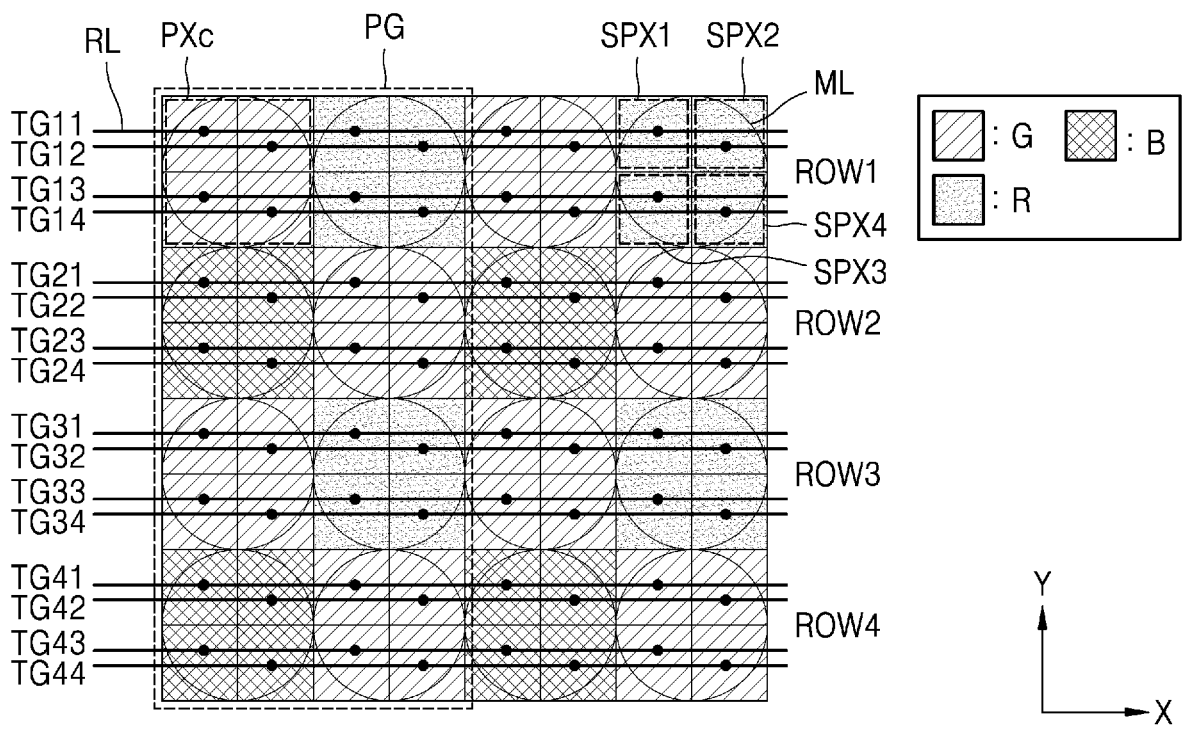
FIG. 13A illustrates a pixel array according to an example embodiment.
Figure 13B:
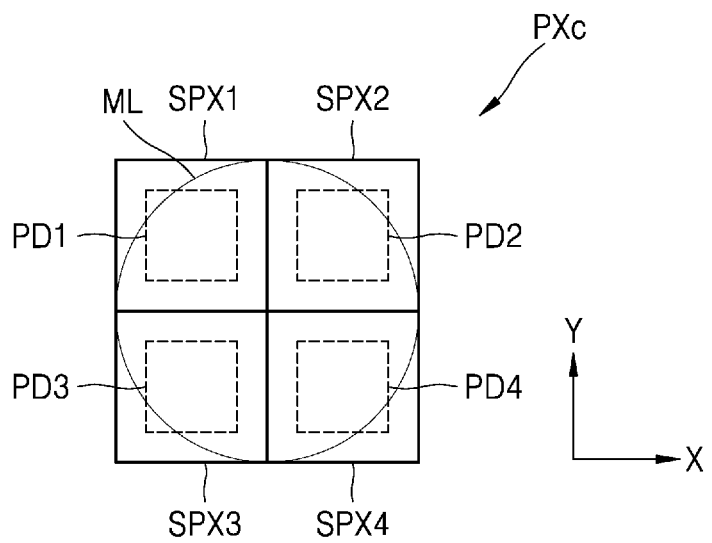
FIG. 13B is a front view of a pixel of the pixel array of FIG. 13A.

FIG. 13A illustrates a pixel array according to an example embodiment, and FIG. 13B is a front view of a pixel of the pixel array of FIG. 13A.

Referring to FIGS. 13A and 13B, each of a plurality of pixels PXc may include a microlens ML and four sub pixels, e.g., a first sub pixel SPX1, a second sub pixel SPX2, a third sub pixel SPX3, and a fourth sub pixel SPX4. The first sub pixel SPX1 may be on the left top of each pixel PXc, the second sub pixel SPX2 may be on the right top of the pixel PXc, the third sub pixel SPX3 may be on the left bottom of the pixel PXc, and the fourth sub pixel SPX4 may be on the right bottom of the pixel PXc. In other words, the first sub pixel SPX1 and the third sub pixel SPX3 may be respectively parallel with the second sub pixel SPX2 and the fourth sub pixel SPX4 in the row direction, e.g., the X-axis direction (or the first direction), and the first sub pixel SPX1 and the second sub pixel SPX2 may be respectively parallel with the third sub pixel SPX3 and the fourth sub pixel SPX4 in the column direction, e.g., the Y-axis direction (or the second direction).

Each of the first sub pixel SPX1, the second sub pixel SPX2, the third sub pixel SPX3, and the fourth sub pixel SPX4 may include a single photoelectric conversion element, e.g., a first photodiode PD1, a second photodiode PD2, a third photodiode PD3, or a fourth photodiode PD4.

Each of a plurality of first sub pixels SPX1 of respective pixels PXc may operate in response to one of a plurality of first transfer control signals TG11, TG21, TG31, and TG41. Each of a plurality of second sub pixels SPX2 of the respective pixels PXc may operate in response to one of a plurality of second transfer control signals TG12, TG22, TG32, and TG42. Each of a plurality of third sub pixels SPX3 of the respective pixels PXc may operate in response to one of a plurality of third transfer control signals TG13, TG23, TG33, and TG43. Each of a plurality of fourth sub pixels SPX4 of the respective pixels PXc may operate in response to one of a plurality of fourth transfer control signals TG14, TG24, TG34, and TG44.

The first transfer control signals TG11, TG21, TG31, and TG41, the second transfer control signals TG12, TG22, TG32, and TG42, the third transfer control signals TG13, TG23, TG33, and TG43, and the fourth transfer control signals TG14, TG24, TG34, and TG44 may be separate signals provided from the row decoder 120 in FIG. 2 through different row lines RL, respectively. In pixels PXc in one row, first sub pixels SPX1 may receive a corresponding first transfer control signal TG11, TG21, TG31, or TG41 through one row line RL; second sub pixels SPX2 may receive a corresponding second transfer control signal TG12, TG22, TG32, or TG42 through the one row line RL; third sub pixels SPX3 may receive a corresponding third transfer control signal TG13, TG23, TG33, or TG43 through the one row line RL; and fourth sub pixels SPX4 may receive a corresponding fourth transfer control signal TG14, TG24, TG34, or TG44 through the one row line RL.

A pixel array 110d may be divided into a plurality of pixel groups PG. For example, each of the pixel groups PG may include pixels PXc in a 2×4 matrix.

Figure 14:
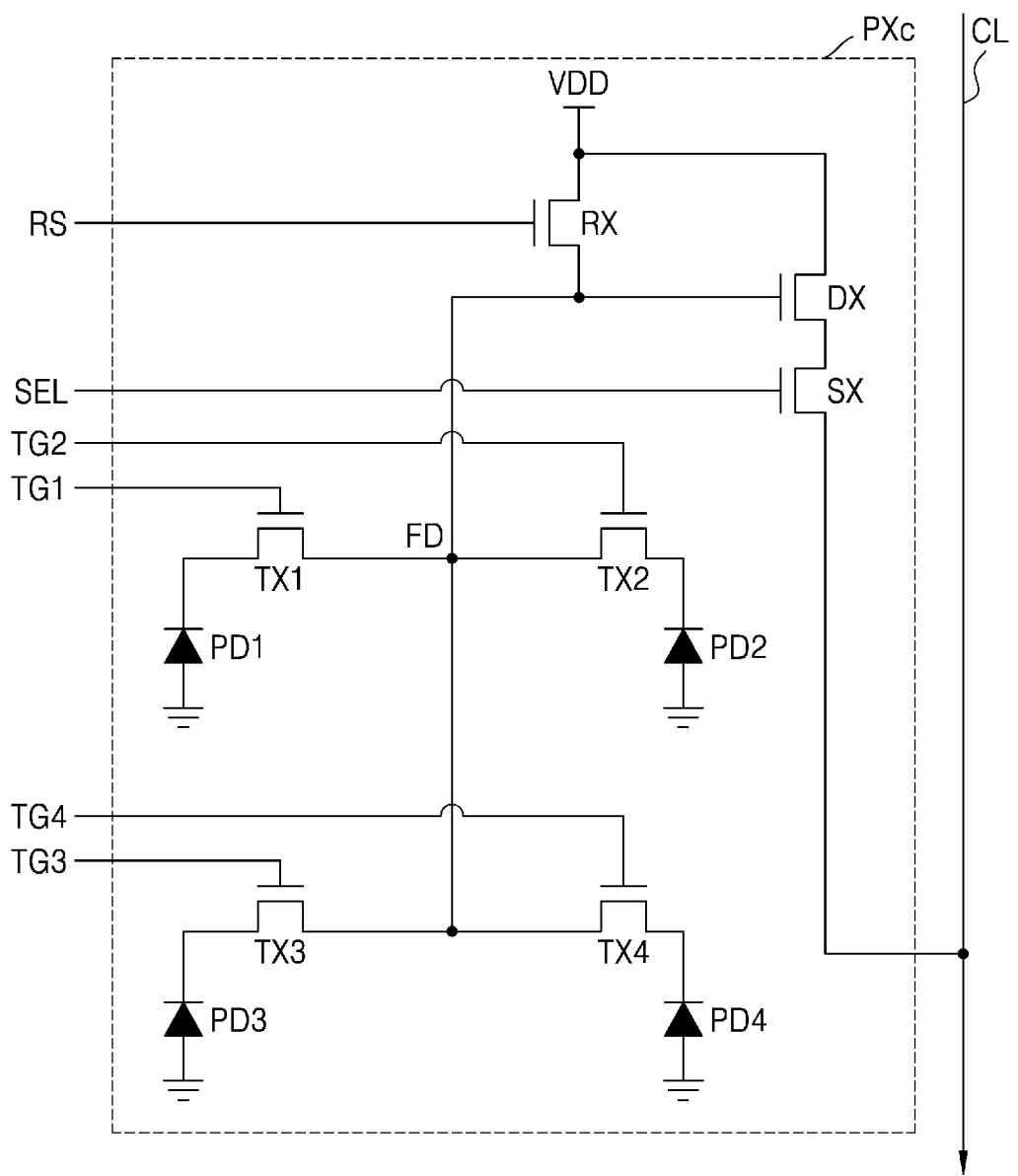
FIG. 14 is an equivalent circuit diagram of the pixel in FIG. 13A.

FIG. 14 is an equivalent circuit diagram of the pixel in FIG. 13A;

Referring to FIG. 14, a pixel PXc may include a first photodiode PD1, a second photodiode PD2, a third photodiode PD3, a fourth photodiode PD4, a first transfer transistor TX1, a second transfer transistor TX2, a third transfer transistor TX3, a fourth transfer transistor TX4, a reset transistor RX, a drive transistor DX, and a select transistor SX.

A floating diffusion node FD (or a floating diffusion region) may be shared by the first photodiode PD1, the second photodiode PD2, the third photodiode PD3, the fourth photodiode PD4, the first transfer transistor TX1, the second transfer transistor TX2, the third transfer transistor TX3, and the fourth transfer transistor TX4.

Each of the first transfer transistor TX1, the second transfer transistor TX2, the third transfer transistor TX3, and the fourth transfer transistor TX4 may be independently turned on or off in response to a transfer control signal applied to the gate terminal thereof among a first transfer control signal TG1, a second transfer control signal TG2, a third transfer control signal TG3, and a fourth transfer control signal TG4. When the first transfer transistor TX1, the second transfer transistor TX2, the third transfer transistor TX3, or the fourth transfer transistor TX4 is turned on, photocharges generated by a corresponding photodiode may be transferred to and stored in the floating diffusion node FD.

A control signal, which is applied to each of the reset transistor, the drive transistor DX, and the select transistor SX, and operations thereof have been described above with reference to FIG. 5.

Figure 15:
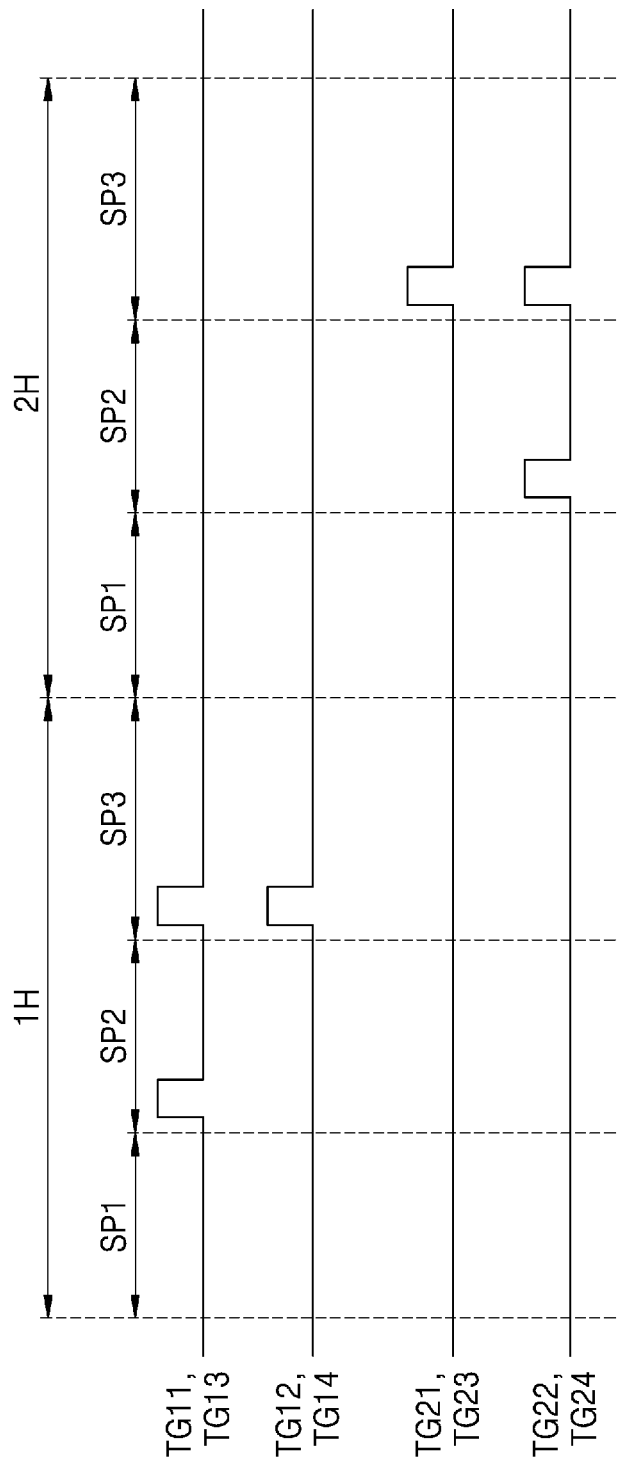
FIG. 15 is a timing diagram of transfer control signals applied to the pixel array of FIG. 13A, according to an example embodiment.

FIG. 15 is a timing diagram of transfer control signals applied to the pixel array of FIG. 13A, according to an example embodiment.

Referring to FIGS. 13A, 14, and 15, a pixel PXc (hereinafter, referred to as a first pixel) in one row, e.g., the first row ROW1, of the pixel array 110d may output a pixel signal VOUT during the first readout period 1H, and a pixel PXc (hereinafter, referred to as a second pixel) in another row, e.g., the second row ROW2, of the pixel array 110d may output a pixel signal VOUT during the second readout period 2H.

During the respective first sub periods SP1 of the first readout period 1H and the second readout period 2H, the first and second pixels may respectively output reset signals.

During the second sup period SP2 of the first readout period 1H, the first transfer control signal TG11 and the third transfer control signal TG13 may toggle. As the first transfer transistor TX1 and the third transfer transistor TX3 of the first pixel are respectively turned on in response to the first transfer control signal TG11 and the third transfer control signal TG13, charges (or photocharges) generated by the first photodiode PD1 and the third photodiode PD3 may be transferred to and stored in the floating diffusion node FD. The first pixel may output a first image signal, e.g., a left image signal, corresponding to the charges stored in the floating diffusion node FD. Accordingly, the first pixel may output the first image signal, which is generated by the first photodiode PD1 and the third photodiode PD3 (or the first sub pixel SPX1 and the third sub pixel SPX3).

During the third sub period SP3 of the first readout period 1H, the first through fourth transfer control signals TG11, TG12, TG13, and TG14 may toggle. The first through fourth transfer transistors TX1 through TX4 of the first pixel may be respectively turned on in response to the first through fourth transfer control signals TG11 through TG14, and charges generated by the first through fourth photodiodes PD1 through PD4 may be transferred to and stored in the floating diffusion node FD. The first pixel may output a sum image signal, e.g., a first sum image signal of the first pixel, corresponding to the charges stored in the floating diffusion node FD. Accordingly, the first sum image signal may be output from the first pixel and counted.

During the second sup period SP2 of the second readout period 2H, as the second transfer transistor TX2 and the fourth transfer transistor TX4 of the second pixel are respectively turned on in response to the second transfer control signal TG22 and the fourth transfer control signal TG24, charges generated by the second photodiode PD2 and the fourth photodiode PD4 may be transferred to and stored in the floating diffusion node FD. The second pixel may output a second image signal, e.g., a right image signal, corresponding to the charges stored in the floating diffusion node FD. Accordingly, the second pixel may output the second image signal, which is generated by the second photodiode PD2 and the fourth photodiode PD4 (or the second sub pixel SPX2 and the fourth sub pixel SPX4).

During the third sub period SP3 of the second readout period 2H, the first through fourth transfer control signals TG21, TG22, TG23, and TG24 may toggle. The first through fourth transfer transistors TX1 through TX4 of the second pixel may be respectively turned on in response to the first through fourth transfer control signals TG21 through TG24, and charges generated by the first through fourth photodiodes PD1 through PD4 may be transferred to and stored in the floating diffusion node FD. The second pixel may output a sum image signal, e.g., a second sum image signal of the second pixel, corresponding to the charges stored in the floating diffusion node FD. Accordingly, the second sum image signal may be output from the second pixel and counted.

As described above, a pixel PXc, e.g., the first pixel, in the first row ROW1 may output the first image signal, e.g., the left image signal, in response to the first and third transfer control signals TG11 and TG13 during the second sub period SP2 of the first readout period 1H; and a pixel PXc, e.g., the second pixel, in the second row ROW2 may output the second image signal, e.g., the right image signal, in response to the second and fourth transfer control signals TG22 and TG24 during the second sub period SP2 of the second readout period 2H.

In an example embodiment, the first transfer control signals TG11 and TG21 may be respectively the same as the fourth transfer control signals TG14 and TG24, and the second transfer control signals TG12 and TG22 may be respectively the same as the third transfer control signals TG13 and TG23. Accordingly, a pixel PXc, e.g., the first pixel, in the first row ROW1 may output a third image signal, e.g., a top image signal, which is generated by the first photodiode PD1 and the fourth photodiode PD4, in response to the first and fourth transfer control signals TG11 and TG14 during the second sub period SP2 of the first readout period 1H; and a pixel PXc, e.g., the second pixel, in the second row ROW2 may output a fourth image signal, e.g., a bottom image signal, which is generated by the second photodiode PD2 and the third photodiode PD3, in response to the second and third transfer control signals TG22 and TG23 during the second sub period SP2 of the second readout period 2H.

Figure 16:
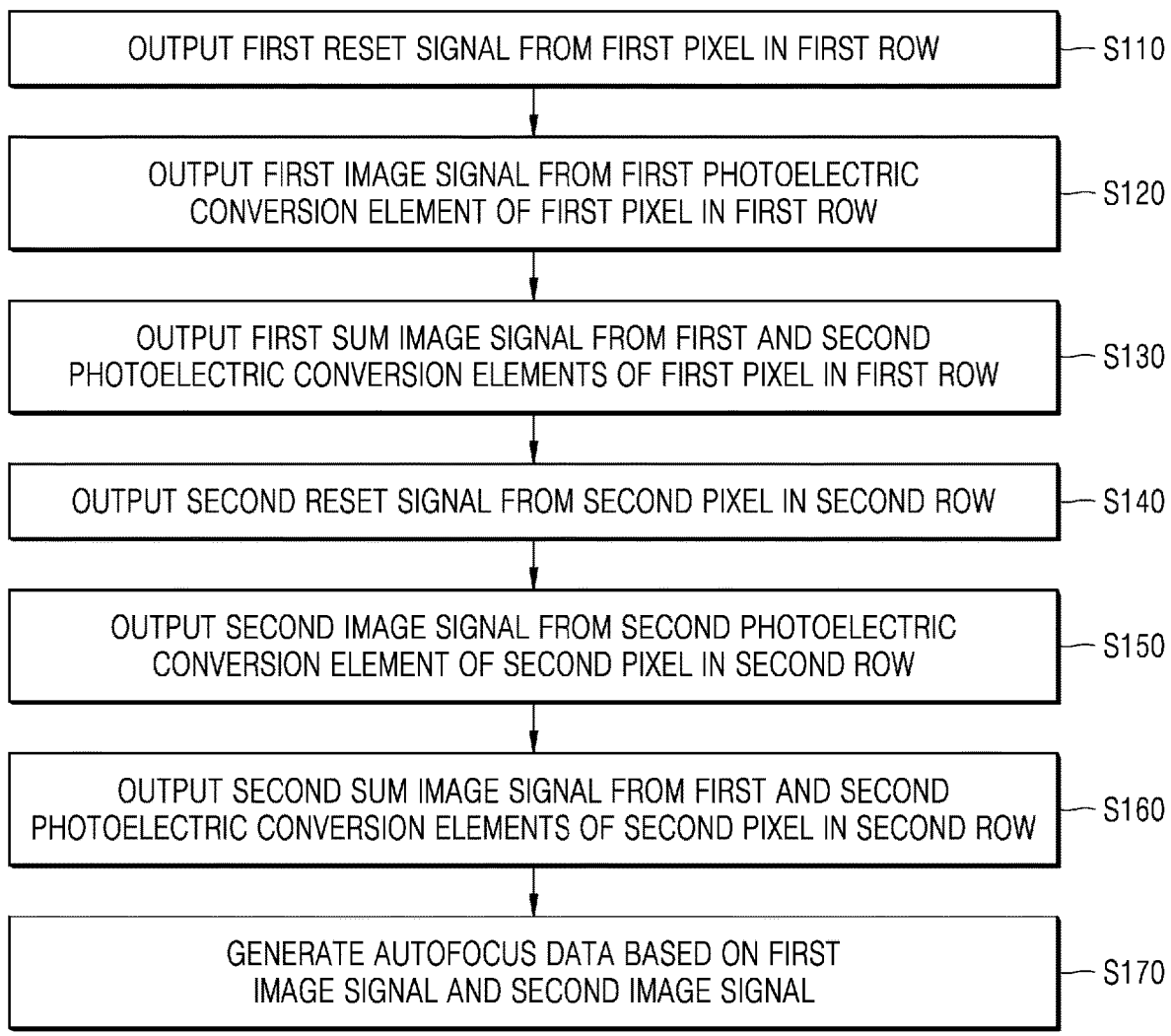
FIG. 16 is a flowchart of a method of operating an image sensor, according to an example embodiment.

FIG. 16 is a flowchart of an operating method of an image sensor, according to an example embodiment. The operating method of FIG. 16 may be performed by the image sensor 100 of FIG. 2.

Referring to FIG. 16, each first pixel in the first row of the pixel array 110 may sequentially output a reset signal, a first image signal, and a sum image signal according to the RSS readout method in operations S110, S120, and S130. Thereafter, each second pixel in the second row of the pixel array 110 may sequentially output a reset signal, a second image signal, and a sum image signal according to the RSS readout method in operations S140, S150, and S160. The first pixel and the second pixel may be arranged in the same column and have the same color.

The first pixel in the first row may output a first reset signal in operation S110. The first pixel may output the first reset signal in response to transfer control signals from the row driver 120.

The first pixel in the first row may output the first image signal from a first photoelectric conversion element in operation S120 and then output a first sum image signal from the first photoelectric conversion element and a second photoelectric conversion element in operation S130.

Thereafter, the second pixel in the second row may output a second reset signal in operation S140, output the second image signal from a second photoelectric conversion element in operation S150, and then output a second sum image signal from a first photoelectric conversion element and the second photoelectric conversion element in operation S160.

When operations S110 through S160 are performed, the signals, e.g., the first reset signal, the first image signal, the first sum image signal, the second reset signal, the second image signal, and the second sum image signal, output from the first and second pixels may be converted into digital values, e.g., count values, by the comparator circuit 140 and the counter circuit 160. A first image signal value, a second image signal value, a first sum image signal value, and a second sum image signal value, from each of which a reset level is removed, may be generated based on a first reset signal value and a second reset signal value.

The signal processor 190 may generate autofocus data based on the first image signal and the second image signal in operation S170. The signal processor 190 may generate a phase detection signal pair based on the first and second image signal values from which the reset level has been removed. A plurality of phase detection signal pairs may be generated based on a plurality of first image signals and a plurality of second image signals, which are output from the pixel array 110.

Figure 17:
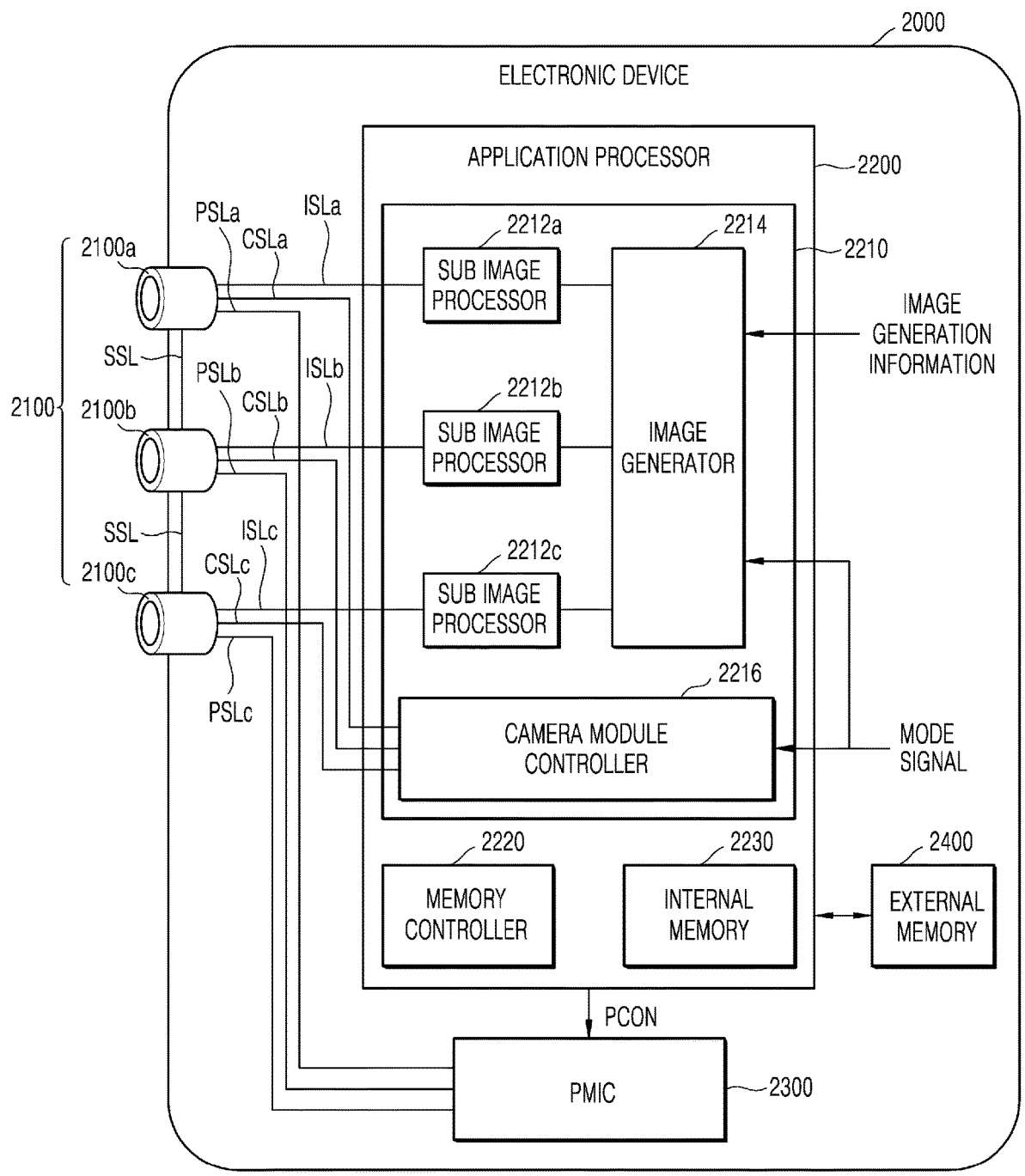
FIGS. 17 and 18 are respectively block diagrams of electronic devices including a multi-camera module according to an example embodiment.
Figure 18:
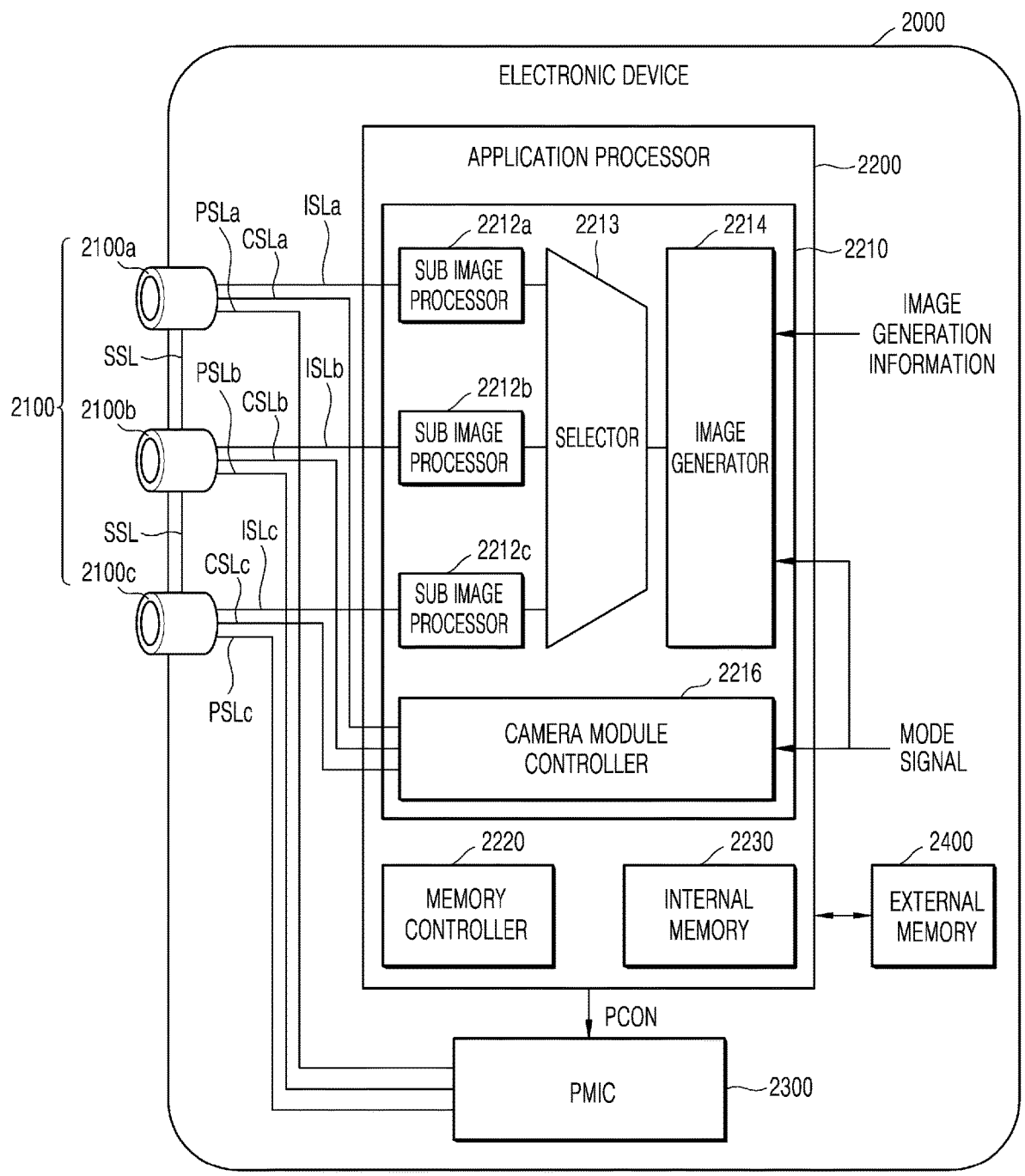
Figure 19:
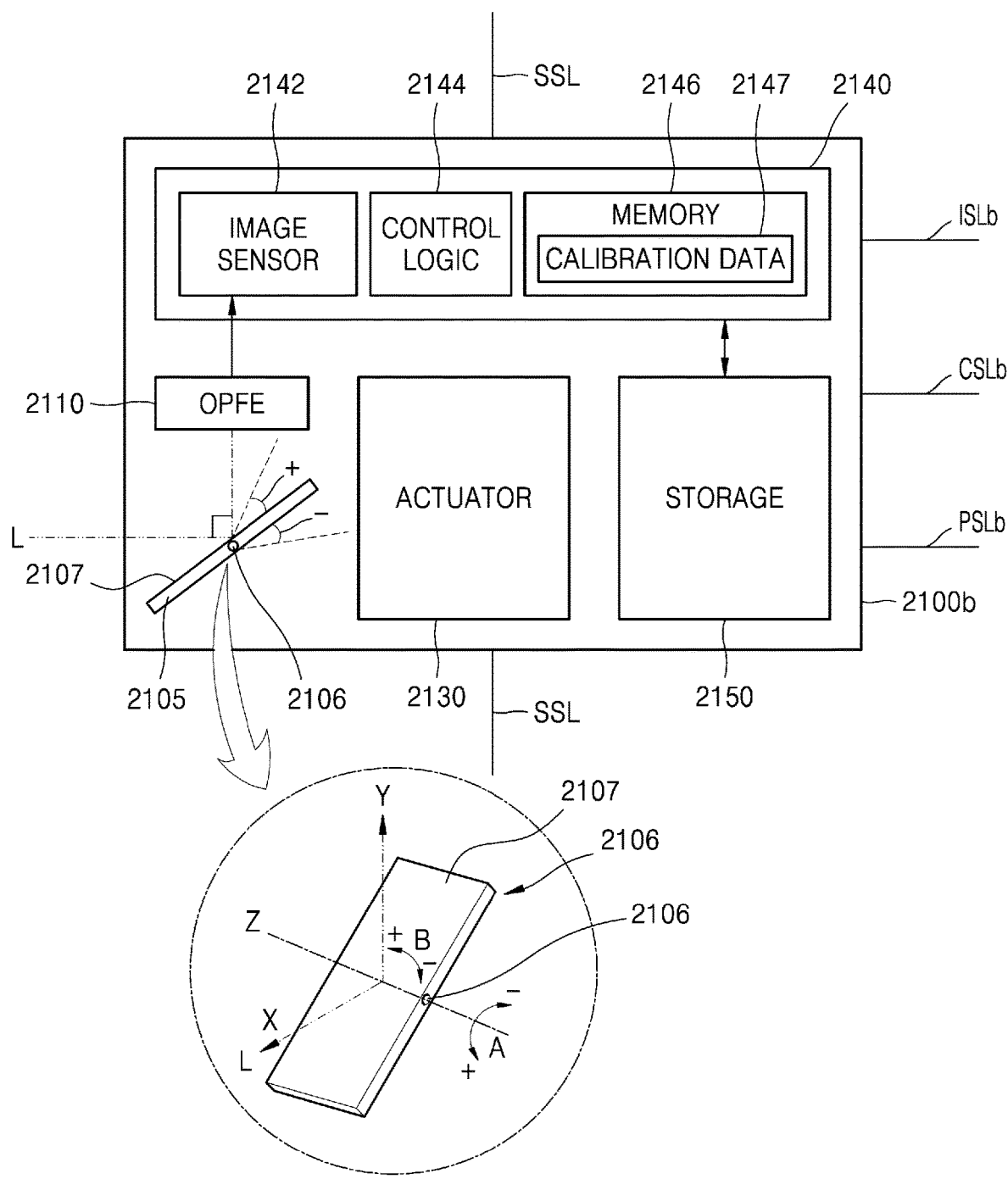
FIG. 19 is a detailed block diagram of a camera module in FIG. 17.

FIGS. 17 and 18 are respectively block diagrams of electronic devices including a multi-camera module according to example embodiments. FIG. 19 is a detailed block diagram of a camera module in FIG. 17.

Referring to FIG. 17, an electronic device 2000 may include a camera module group 2100, an application processor 2200, a power management integrated circuit (PMIC) 2300, and an external memory 2400.

The camera module group 2100 may include a plurality of camera modules 2100a, 2100b, and 2100c. Although three camera modules 2100a, 2100b, and 2100c are illustrated in FIG. 17, embodiments are not limited thereto. In some embodiments, the camera module group 2100 may be modified to include only two camera modules or include "n" camera modules, where "n" is a natural number of 4 or greater.

The detailed configuration of the camera module 2100b will be described with reference to FIG. 19 below. The descriptions below may also applied to the other camera modules 2100a and 2100c.

Referring to FIG. 19, the camera module 2100b may include a prism 2105, an optical path folding element (OPFE) 2110, an actuator 2130, an image sensing device 2140, and a storage 2150.

The prism 2105 may include a reflective surface 2107 of a light reflecting material and may change the path of light L incident from outside.

In some embodiments, the prism 2105 may change the path of the light L incident in a first direction X into a second direction Y perpendicular to the first direction X. The prism 2105 may rotate the reflective surface 2107 of the light reflecting material in a direction A around a central shaft 2106 or rotate the central shaft 2106 in a direction B so that the path of the light L incident in the first direction X is changed into the second direction Y perpendicular to the first direction X. At this time, the OPFE 2110 may move in a third direction Z, which is perpendicular to the first and second directions X and Y.

In some embodiments, a maximum rotation angle, in an A direction, of the prism 2105 may be less than or equal to 15 degrees in a plus (+) A direction and greater than 15 degrees in a minus (−) A direction, but embodiments are not limited thereto.

In some embodiment, the prism 2105 may move between about 20 degrees in a (+) B direction or in a (−) B direction, or in a range from about 10 degrees to about 20 degrees in the (+) B direction or in the (−) B direction, or from about 15 degrees to about 20 degrees in the (+) B direction or in the (−) B direction. An angle by which the prism 2105 moves in the (+) B direction may be the same as or similar, within a difference of about 1 degree, to an angle by which the prism 2105 moves in the (−) B direction.

In some embodiments, the prism 2105 may move the reflective surface 2107 of the light reflecting material in the third direction Z parallel with an extension direction of the central shaft 2106.

In some embodiments, the camera module 2100b may include at least two prisms and may variously change the path of the light L incident in the first direction X into, for example, the second direction Y perpendicular to the first direction X, then into the first direction X or the third direction Z, and then into the second direction Y or the like.

The OPFE 2110 may include, for example, "m" optical lenses, where "m" is a natural number. The "m" lenses may move in the second direction Y and change an optical zoom ratio of the camera module 2100b. For example, when the default optical zoom ratio of the camera module 2100b is Z, the optical zoom ratio of the camera module 2100b may be changed to 3Z, 5Z, or greater by moving the "m" optical lenses included in the OPFE 2110.

The actuator 2130 may move the OPFE 2110 or an optical lens to a certain position. For example, the actuator 2130 may adjust the position of the optical lens such that an image sensor 2142 is positioned at a focal length of the optical lens for accurate sensing.

The image sensing device 2140 may include the image sensor 2142, a control logic 2144, and a memory 2146. The image sensor 2142 may sense an image of an object using the light L provided through the optical lens. The image sensor 100 described with reference to FIGS. 2 through 16 may be used as the image sensor 2142. Each of a plurality of pixels PX of the pixel array 110 may include at least one first photoelectric conversion element and at least one second photoelectric conversion element, which are parallel with each other under a microlens. A first image signal, e.g., a left image signal (or a top image signal) may be output from the first photoelectric conversion element of each pixel PX in a certain row among the pixels PX. A second image signal, e.g., a right image signal (or a bottom image signal) may be output from the second photoelectric conversion element of each pixel PX in another certain row among the pixels PX. Autofocus data, e.g., a phase detection signal pair, for an AF function may be generated based on the first image signal and the second image signal, which are respectively output from two pixels PX respectively in two adjacent rows and in one column.

The control logic 2144 may generally control operations of the camera module 2100b and process a sensed image. For example, the control logic 2144 may control operation of the camera module 2100b according to a control signal provided through a control signal line CSLb. For example, the control logic 2144 may control the actuator 2130 such that the optical lens is positioned at a focal length according to AF based on a focusing signal received from the application processor 2200. The control logic 2144 may extract image data corresponding to a particular image (e.g., the face, arms, legs, or the like of a person) from the sensed image.

In some embodiments, the control logic 2144 may perform image processing, such as encoding or noise reduction, on the sensed image.

The memory 2146 may store information, such as calibration data 2147, to be used in the operation of the camera module 2100b. The calibration data 2147 may include information, which is used when the camera module 2100b generates image data using the light L provided from outside. For example, the calibration data 2147 may include information about the degree of rotation, information about a focal length, information about an optical axis, or the like.

When the camera module 2100b is implemented as a multistate camera that has a focal length varying with the position of the optical lens, the calibration data 2147 may include a value of a focal length for each position (or state) of the optical lens and information about auto focusing. In some embodiments, two chips may be stacked, wherein the image sensor 2142 may be formed in one chip of the two chips, and the control logic 2144, the storage 2150, and the memory 2146 may be formed in the other chip of the two chips.

The storage 2150 may store image data sensed by the image sensor 2142. The storage 2150 may be provided outside the image sensing device 2140 and may form a stack with a sensor chip of the image sensing device 2140. In some embodiments, the storage 2150 may include electrically erasable programmable read-only memory (EEPROM), but embodiments are not limited thereto. In some embodiments, the image sensor 2142 may include a pixel array, and the control logic 2144 may include an analog-to-digital converter and an image signal processor that processes a sensed image.

Referring to FIGS. 17 and 19, in some embodiments, each of the camera modules 2100a, 2100b, and 2100c may include the actuator 2130. Accordingly, the camera modules 2100a, 2100b, and 2100c may include the calibration data 2147, which is the same or different among the camera modules 2100a, 2100b, and 2100c according to the operation of the actuator 2130 included in each of the camera modules 2100a, 2100b, and 2100c.

In some embodiments, one (e.g., the camera module 2100b) of the camera modules 2100a, 2100b, and 2100c may be of a folded-lens type including the prism 2105 and the OPFE 2110 while the other camera modules (e.g., the camera modules 2100a and 2100c) may be of a vertical type that does not include the prism 2105 and the OPFE 2110. However, embodiments are not limited thereto.

In some embodiments, one (e.g., the camera module 2100c) of the camera modules 2100a, 2100b, and 2100c may include a vertical depth camera, which extracts depth information using an infrared ray (IR). In this case, the application processor 2200 may generate a three-dimensional (3D) depth image by merging image data provided from the depth camera with image data provided from another camera module (e.g., the camera module 2100a or 2100b).

In some embodiments, at least two camera modules (e.g., 2100a and 2100b) among the camera modules 2100a, 2100b, and 2100c may have different field-of-views. In this case, the two camera modules (e.g., 2100a and 2100b) among the camera modules 2100a, 2100b, and 2100c may respectively have different optical lenses, but embodiments are not limited thereto.

In some embodiments, the camera modules 2100a, 2100b, and 2100c may have different field-of-views from one another. For example, the camera module 2100a may include an ultrawide camera, the camera module 2100b may include a wide camera, and the camera module 2100c may include a telecamera, but embodiments are not limited thereto. In this case, the camera modules 2100a, 2100b, and 2100c may respectively have different optical lenses, but embodiments are not limited thereto.

In some embodiments, the camera modules 2100a, 2100b, and 2100c may be physically separated from one another. In other words, the sensing area of the image sensor 2142 is not divided to be used by the camera modules 2100a, 2100b, and 2100c, but the image sensor 2142 may be independently included in each of the camera modules 2100a, 2100b, and 2100c.

Referring back to FIG. 17, the application processor 2200 may include an image processing unit 2210, a memory controller 2220, and an internal memory 2230. The application processor 2200 may be separately implemented from the camera modules 2100a, 2100b, and 2100c. For example, the application processor 2200 and the camera modules 2100a, 2100b, and 2100c may be implemented in different semiconductor chips.

The image processing unit 2210 may include a plurality of sub image processors 2212a, 2212b, and 2212c, an image generator 2214, and a camera module controller 2216.

The image processing unit 2210 may include as many sub image processors 2212a, 2212b, and 2212c as the camera modules 2100a, 2100b, and 2100c.

Image data generated from the camera module 2100a may be provided to the sub image processor 2212a through an image signal line ISLa, image data generated from the camera module 2100b may be provided to the sub image processor 2212b through an image signal line ISLb, and image data generated from the camera module 2100c may be provided to the sub image processor 2212c through an image signal line ISLc. Such image data transmission may be performed using, for example, a mobile industry processor interface (MIPI) based camera serial interface (CSI), but embodiments are not limited thereto.

In some embodiments, a single sub image processor may be provided for a plurality of camera modules. For example, differently from FIG. 17, the sub image processors 2212a and 2212c may not be separated but may be integrated into a single sub image processor, and the image data provided from the camera module 2100a or the camera module 2100c may be selected by a selection element (e.g., a multiplexer) and then provided to the integrated sub image processor. At this time, the sub image processor 2212b may not be integrated and may receive image data from the camera module 2100b.

In some embodiments, image data generated from the camera module 2100a may be provided to the sub image processor 2212a through the image signal line ISLa, image data generated from the camera module 2100b may be provided to the sub image processor 2212b through the image signal line ISLb, and image data generated from the camera module 2100c may be provided to the sub image processor 2212c through the image signal line ISLc. In addition, while the image data processed by the sub image processor 2212b may be directly provided to the image generator 2214, one of the image data processed by the sub image processor 2212a and the image data processed by the sub image processor 2212c may be selected by a selection element (e.g., a multiplexer) and then provided to the image generator 2214.

Each of the sub image processors 2212a, 2212b, and 2212c may perform image processing, such as a bad pixel correction, 3A adjustment (i.e., autofocus correction, auto-white balance, and auto-exposure), noise reduction, sharpening, gamma control, or remosaic, on image data provided from a corresponding one of the camera modules 2100a, 2100b, and 2100c.

In some embodiments, remosaic signal processing may be performed by each of the camera modules 2100a, 2100b, and 2100c, and a processing result may be provided to each of the sub image processors 2212a, 2212b, and 2212c.

The image data processed by each of the sub image processors 2212a, 2212b, and 2212c may be provided to the image generator 2214. The image generator 2214 may generate an output image using the image data provided from each of the sub image processors 2212a, 2212b, and 2212c according to image generation information or a mode signal.

In detail, the image generator 2214 may generate the output image by merging at least portions of respective pieces of image data, which are respectively generated from the camera modules 2100a, 2100b, and 2100c having different field-of-views, according to the image generation information or the mode signal. Alternatively, the image generator 2214 may generate the output image by selecting one of pieces of image data, which are respectively generated from the camera modules 2100a, 2100b, and 2100c having different field-of-views, according to the image generation information or the mode signal.

In some embodiments, the image generation information may include a zoom signal or a zoom factor. In some embodiments, the mode signal may be based on a mode selected by a user.

When the image generation information includes a zoom signal or a zoom factor and the camera modules 2100a, 2100b, and 2100c have different field-of-views, the image generator 2214 may perform different operations according to different kinds of zoom signals. For example, when the zoom signal is a first signal, the image generator 2214 may generate an output image using image data output from the sub image processor 2212a, between the image data output from the sub image processor 2212a and image data output from the sub image processor 2212c, and using image data output from the sub image processor 2212b. When the zoom signal is a second signal different from the first signal, the image generator 2214 may generate an output image using image data output from the sub image processor 2212c, between image data output from the sub image processor 2212a and image data output from the sub image processor 2212c, and image data output from the sub image processor 2212b. When the zoom signal is a third signal different from the first signal and the second signal, the image generator 2214 may generate an output image by selecting one of the pieces of image data respectively output from the sub image processors 2212a, 2212b, and 2212c, instead of performing the merging of pieces of image data respectively output from the sub image processors 2212a, 2212b, and 2212c. However, embodiments are not limited thereto, and a method of processing image data may be variously changed.

Referring to FIG. 18, in some embodiments, the image processing unit 2210 may further include a selector 2213, which selects and transmits the outputs of the sub image processors 2212a, 2212b, and 2212c to the image generator 2214.

In this case, the selector 2213 may perform a different operation according to a zoom signal or a zoom factor. For example, when the zoom signal is a fourth signal (for example, when a zoom ratio is a first ratio), the selector 2213 may select and transmit one of the outputs of the sub image processors 2212a, 2212b, and 2212c.

When the zoom signal is a fifth signal different from the fourth signal (for example, when the zoom ratio is a second ratio), the selector 2213 may sequentially transmit "p" outputs (where "p" is a natural number of 2 or greater) among the outputs of the sub image processors 2212a, 2212b, and 2212c. For example, the selector 2213 may sequentially transmit the output of the sub image processor 2212b and the output of the sub image processor 2212c to the image generator 2214. For example, the selector 2213 may sequentially transmit the output of the sub image processor 2212a and the output of the sub image processor 2212b to the image generator 2214. The image generator 2214 may merge the sequentially received "p" outputs with each other and generate a single output image.

Herein, image processing such as demosaic, down scaling to a video/preview resolution, gamma correction, and high dynamic range (HDR) processing, may be performed by the sub image processors 2212a, 2212b, and 2212c, and processed image data may be transmitted to the image generator 2214. Accordingly, although the processed image is provided from the selector 2213 to the image generator 2214 through a single signal line, the image merging operation of the image generator 2214 may be performed at a high speed.

In some embodiments, the image generator 2214 may receive a plurality of pieces of image data, which have different exposure times, from at least one of the sub image processors 2212a, 2212b, and 2212c and perform HDR processing on the plurality of pieces of image data, thereby generating merged image data having an increased dynamic range.

The camera module controller 2216 may provide a control signal to each of the camera modules 2100a, 2100b, and 2100c. A control signal generated by the camera module controller 2216 may be provided to a corresponding one of the camera modules 2100a, 2100b, and 2100c through a corresponding one of control signal lines CSLa, CSLb, and CSLc, which are separated from one another.

One (e.g., the camera module 2100b) of the camera modules 2100a, 2100b, and 2100c may be designated as a master camera according to the mode signal or the image generation signal including a zoom signal, and the other camera modules (e.g., 2100a and 2100c) may be designated as slave cameras. Such designation information may be included in a control signal and provided to each of the camera modules 2100a, 2100b, and 2100c through a corresponding one of the control signal lines CSLa, CSLb, and CSLc, which are separated from one another.

A camera module that operate as a master or a slave may be changed according to a zoom factor or an operation mode signal. For example, when the field-of-view of the camera module 2100a is greater than that of the camera module 2100b and the zoom factor indicates a low zoom ratio, the camera module 2100a may operate as a master and the camera module 2100b may operate as a slave. On the other hand, when the zoom factor indicates a high zoom ratio, the camera module 2100b may operate as a master and the camera module 2100a may operate as a slave.

In some embodiments, a control signal provided from the camera module controller 2216 to each of the camera modules 2100a, 2100b, and 2100c may include a sync enable signal. For example, when the camera module 2100b is a master camera and the camera module 2100a is a slave camera, the camera module controller 2216 may transmit the sync enable signal to the camera module 2100b. The camera module 2100b provided with the sync enable signal may generate a sync signal based on the sync enable signal and may provide the sync signal to the camera modules 2100a and 2100c through a sync signal line SSL. The camera modules 2100a, 2100b, and 2100c may be synchronized with the sync signal and may transmit image data to the application processor 2200.

In some embodiments, a control signal provided from the camera module controller 2216 to each of the camera modules 2100a, 2100b, and 2100c may include mode information according to the mode signal. The camera modules 2100a, 2100b, and 2100c may operate in a first operation mode or a second operation mode in relation with a sensing speed based on the mode information.

In the first operation mode, the camera modules 2100a, 2100b, and 2100c may generate an image signal at a first speed (e.g., at a first frame rate), encode the image signal at a second speed higher than the first speed (e.g., at a second frame rate higher than the first frame rate), and transmit an encoded image signal to the application processor 2200. For example, the second speed may be about 30 times or less the first speed.

The application processor 2200 may store the received image signal, i.e., the encoded image signal, in the internal memory 2230 therein or the external memory 2400 outside the application processor 2200. Thereafter, the application processor 2200 may read the encoded image signal from the internal memory 2230 or the external memory 2400, decode the encoded image signal, and display image data generated based on a decoded image signal. For example, a corresponding one of the sub image processors 2212a, 2212b, and 2212c of the image processing unit 2210 may perform the decoding and may also perform image processing on the decoded image signal.

In the second operation mode, the camera modules 2100a, 2100b, and 2100c may generate an image signal at a third speed lower than the first speed (e.g., at a third frame rate lower than the first frame rate) and transmit the image signal to the application processor 2200. The image signal provided to the application processor 2200 may not have been encoded. The application processor 2200 may perform image processing on the image signal or store the image signal in the internal memory 2230 or the external memory 2400.

The PMIC 2300 may provide power, e.g., a power supply voltage, to each of the camera modules 2100a, 2100b, and 2100c. For example, under the control of the application processor 2200, the PMIC 2300 may provide first power to the camera module 2100a through a power signal line PSLa, second power to the camera module 2100b through a power signal line PSLb, and third power to the camera module 2100c through a power signal line PSLc.

The PMIC 2300 may generate power corresponding to each of the camera modules 2100a, 2100b, and 2100c and adjust the level of the power, in response to a power control signal PCON from the application processor 2200. The power control signal PCON may include a power adjustment signal for each operation mode of the camera modules 2100a, 2100b, and 2100c. For example, the operation mode may include a low-power mode. The power control signal PCON may include information about a camera module to operate in the low-power mode and a power level to be set. The same or different levels of power may be respectively provided to the camera modules 2100a, 2100b, and 2100c. The level of power may be dynamically changed.

While the disclosure has been particularly shown and described with reference to example embodiments thereof, it will be understood that various changes in form and details may be made therein without departing from the spirit and scope of the following claims.

What is claimed is:

1. An image sensor comprising:
    a pixel array including a plurality of pixels arranged in a matrix, each pixel of the plurality of pixels including a microlens, a first photoelectric conversion element, and a second photoelectric conversion element, the first photoelectric conversion element and the second photoelectric conversion element being arranged in parallel with each other in a first direction below the microlens; and
    a row decoder configured to:
        control a first image signal and a first sum image signal to be sequentially output from a first pixel in a first row of the pixel array during a first readout period, the first image signal being generated by the first photoelectric conversion element of the first pixel and the first sum image signal being generated by the first photoelectric conversion element and the second photoelectric conversion element of the first pixel, and
        control a second image signal and a second sum image signal to be sequentially output from a second pixel in a second row of the pixel array during a second readout period, the second image signal being generated by the second photoelectric conversion element of the second pixel and the second sum image signal being generated by the first photoelectric conversion element and the second photoelectric conversion element of the second pixel.

2. The image sensor of claim 1, further comprising a signal processor configured to generate a pair of phase detection signals for autofocus based on the first image signal and the second image signal.

3. The image sensor of claim 1, wherein the row decoder is further configured to:
    provide a plurality of first control signals to the first pixel, the plurality of first control signals controlling a first reset signal, the first image signal, and the first sum image signal to be sequentially output from the first pixel during the first readout period, the first reset signal indicating a reset level of the first pixel, and
    provide a plurality of second control signals to the second pixel, the plurality of second control signals controlling a second reset signal, the second image signal, and the second sum image signal to be sequentially output from the second pixel during the second readout period, the second reset signal indicating a reset level of the second pixel.

4. The image sensor of claim 1, wherein each pixel of the plurality of pixels further includes:
    a floating diffusion node;
    a first transfer transistor configured to be turned on to transfer, to the floating diffusion node, photocharge that is generated by the first photoelectric conversion element;
    a second transfer transistor configured to be turned on to transfer, to the floating diffusion node, photocharge that is generated by the second photoelectric conversion element;
    a reset transistor configured to be turned on to reset the floating diffusion node to a power supply voltage; and
    a drive transistor configured to output a pixel signal corresponding to a potential of the floating diffusion node,
    wherein, during the first readout period, the second transfer transistor of the first pixel is turned on at a time later than when the first transfer transistor of the first pixel is firstly turned on, and
    wherein, during the second readout period, the first transfer transistor of the second pixel is turned on at a time later than when the second transfer transistor of the second pixel is firstly turned on.

5. The image sensor of claim 4, wherein the row decoder is further configured to:
    respectively provide a first transfer control signal and a second transfer control signal to the first transfer transistor and the second transfer transistor of the first pixel during the first readout period, and respectively provide a third transfer control signal and a fourth transfer control signal to the first transfer transistor and the second transfer transistor of the second pixel during the second readout period, and wherein the first transfer control signal is the same as the fourth transfer control signal, and the second transfer control signal is the same as the third transfer control signal.

6. The image sensor of claim 5, wherein the row decoder includes a predecoder, the predecoder being configured to:
during the first readout period, select, as the first transfer control signal, a first reference control signal from the first reference control signal and a second reference control signal and select the second reference control signal as the second transfer control signal, and
during the second readout period, select the second reference control signal as the third transfer control signal and select the first reference control signal as the fourth transfer control signal.

7. The image sensor of claim 1, further comprising a readout circuit configured to convert the first image signal and the second image signal into digital signals based on N counting clock pulses and to convert the first sum image signal and the second sum image signal into digital signals based on 2N counting clock pulses, N being a positive integer of 2 or greater.

8. The image sensor of claim 1, wherein the first pixel and the second pixel are respectively configured to convert optical signals in a same wavelength band into electrical signals.

9. The image sensor of claim 1, wherein the first pixel and the second pixel are in a same column in the pixel array.

10. The image sensor of claim 1, wherein each pixel of the plurality of pixels further includes a third photoelectric conversion element and a fourth photoelectric conversion element respectively arranged in parallel with the first photoelectric conversion element and the second photoelectric conversion element in a second direction perpendicular to the first direction, and
wherein the row decoder is further configured to:
control a third image signal and a third sum image signal to be sequentially output from the first pixel during the first readout period, the third image signal being generated by the first photoelectric conversion element and the third photoelectric conversion element of the first pixel, and the third sum image signal being generated by the first, second, third, and fourth photoelectric conversion elements of the first pixel, and
control a fourth image signal and a fourth sum image signal to be sequentially output from the second pixel during the second readout period, the fourth image signal being generated by the second photoelectric conversion element and the fourth photoelectric conversion elements of the second pixel, and the fourth sum image signal being generated by the first, second, third, and fourth photoelectric conversion elements of the second pixel.

11. An image sensor comprising:
a pixel array including a plurality of row lines extending in a first direction, a plurality of column lines extending in a second direction perpendicular to the first direction, and a plurality of pixels connected to the plurality of row lines and the plurality of column lines and arranged in a matrix, each pixel of the plurality of pixels including a first sub pixel and a second sub pixel that are arranged in parallel with each other in a third direction; and a row decoder configured to provide a plurality of first control signals to a first pixel in a first row of the pixel array and to provide a plurality of second control signals to a second pixel in a second row of the pixel array,
wherein the pixel array is configured to:
during a first readout period, output a first image signal from the first sub pixel of the first pixel and output a first sum image signal from the first sub pixel and the second sub pixel of the first pixel through a first column line in response to the plurality of first control signals; and
during a second readout period, output a second image signal from the second sub pixel of the second pixel and output a second sum image signal from the first sub pixel and the second sub pixel of the second pixel through the first column line in response to the plurality of second control signals.

12. The image sensor of claim 11, further comprising a signal processor configured to generate a pair of phase detection signals based on the first image signal and the second image signal, and perform a phase difference calculation for autofocus based on the pair of phase detection signals.

13. The image sensor of claim 11, wherein each of the first sub pixel and the second sub pixel includes one photoelectric conversion element, and
wherein the first sub pixel and the second sub pixel share one microlens.

14. The image sensor of claim 11, wherein the third direction is same as the first direction.

15. The image sensor of claim 11, wherein the third direction is same as the second direction.

16. A method of operating an image sensor including a pixel array, the method comprising:
outputting a first image signal from a first photoelectric conversion element of a first pixel in a first row of the pixel array, the first pixel including the first photoelectric conversion element and a second photoelectric conversion element arranged in parallel with each other in a first direction;
outputting a first sum image signal from the first photoelectric conversion element and the second photoelectric conversion element of the first pixel;
outputting a second image signal from a second photoelectric conversion element of a second pixel in a second row of the pixel array, the second pixel including a first photoelectric conversion element and the second photoelectric conversion element arranged in parallel with each other in the first direction;
outputting a second sum image signal from the first photoelectric conversion element and the second photoelectric conversion element of the second pixel; and
generating autofocus data based on the first image signal and the second image signal.

17. The method of claim 16, further comprising:
outputting a first reset signal from the first pixel, the first reset signal indicating a reset level of the first pixel; and
outputting a second reset signal from the second pixel, the second reset signal indicating a reset level of the second pixel.

18. The method of claim 16, wherein the first pixel and the second pixel are respectively configured to convert optical signals in a same wavelength band into electrical signals.

19. The method of claim 16, wherein the first pixel and the second pixel are in a same column in the pixel array of the image sensor.

20. The method of claim 16, wherein the generating the autofocus data includes generating, based on the first image signal and the second image signal, a pair of phase detection signals to be used for a phase difference calculation.

* * * * *